United States Patent
Anuszczyk et al.

(10) Patent No.: US 8,037,195 B2
(45) Date of Patent: *Oct. 11, 2011

(54) METHOD AND APPARATUS FOR MANAGING COMPONENTS IN AN IT SYSTEM

(75) Inventors: Jeffrey John Anuszczyk, Framingham, MA (US); David Jay Barbrow, Newton, MA (US); Firdaus Bhathena, Andover, MA (US); Peter Demarest Beaman, Wellesley, MA (US); Stanislaw Kowalczyk, Boston, MA (US); Blair Francis Wheeler, Winchester, MA (US)

(73) Assignee: Symantec Corporation, Mountain View, CA (US)

( * ) Notice: Subject to any disclaimer, the term of this patent is extended or adjusted under 35 U.S.C. 154(b) by 190 days.

This patent is subject to a terminal disclaimer.

(21) Appl. No.: 12/354,645

(22) Filed: Jan. 15, 2009

(65) Prior Publication Data

US 2009/0125758 A1    May 14, 2009

Related U.S. Application Data

(63) Continuation of application No. 10/021,535, filed on Dec. 12, 2001, now Pat. No. 7,483,970.

(51) Int. Cl.
*G06F 15/16* (2006.01)
(52) U.S. Cl. .................. 709/229; 709/224; 714/28
(58) Field of Classification Search .................. 709/224; 714/28
See application file for complete search history.

(56) References Cited

U.S. PATENT DOCUMENTS

| | | | |
|---|---|---|---|
| 5,440,738 A | 8/1995 | Bowman et al. | |
| 5,758,071 A | 5/1998 | Burgess et al. | |
| 6,138,122 A | 10/2000 | Smith et al. | |
| 6,170,056 B1 | 1/2001 | Sidie | |
| 6,175,837 B1 | 1/2001 | Sharma et al. | |
| 6,263,348 B1 | 7/2001 | Kathrow et al. | |
| 6,393,438 B1 * | 5/2002 | Kathrow et al. | 1/1 |

FOREIGN PATENT DOCUMENTS

| | | |
|---|---|---|
| EP | 0707263 | 4/1996 |
| EP | 1107108 | 6/2001 |
| WO | 0179998 | 10/2001 |

OTHER PUBLICATIONS

Gautam Kar, An Architecture for Managing Application Services over Global Networks, Apr. 2001, all pages.*
Search Report for 02763549.9-2211/1573581 PCT/US0227348, dated Oct. 6, 2008.

(Continued)

*Primary Examiner* — John Follansbee
*Assistant Examiner* — Glenford Madamba
(74) *Attorney, Agent, or Firm* — Meyertons, Hood, Kivlin, Kowert & Goetzel, P.C.; Dean M. Munyon

(57) ABSTRACT

A system and method for collecting information on components in an information technology (IT) system. This embodiment features discovering components in the IT system, determining at least one dependency between two or more of the discovered components, and tracking changes to the discovered components and the dependency between two or more of the discovered components. The discovery of components can be carried out using fingerprints of components, which can include key elements of the component that exist in a full model of all of the elements of the component.

20 Claims, 17 Drawing Sheets

OTHER PUBLICATIONS

Keller, et al., "Towards a CIM Schema for RunTime Application Management," 12th International Workshop on Distributed Systems: Operations and Management DSOM'2001 Nancy France, Oct. 15-17, 2001.

Bagchi, et al., "Dependency Analysis in Distributed Systems Using Fault Injection: Application to Problem Determination in an e-commerce Environment," 2th International Workshop on Distributed Systems: Operations and Management DSOM'2001 Nancy France, Oct. 15-17, 2001.

Keller, et al., "Determining Service Dependencies in Distributed Systems," Proceedings of the IEEE International Conference on Communication, Jun. 2001.

Ensel, et al., "Managing Application Service Dependencies with XML and the Resource Description Framework," Proceedings of the 7th International IFIP/IEEE Symposium on Integrated Management, May 2001.

Brown, et al., "An Active Approach to Characterizing Dynamic Dependencies for Problem Determination in a Distributed Environment," Proceedings of the 7th International IFIP/IEEE Symposium on Integrated Management, May 2001.

Kar, et al., "An Architecture for Managing Application Services Over Global Networks," Proceedings of the 20th Annual Joint Conference of the IEEE Computer and Communication Societies, Apr. 2001.

Keller, "CIM/CORBA-basiertes Management Verteilter Kooperierender Managemtsysteme,"Proceedingsof the GI-Fachtagung Kommunikation in Verteilten Systemen (KiVS), Hamburg, Germany, Feb. 2001.

Keller, et al., "Classification and Computation of Dependencies for Distributed Management," Proceedings of the IEEE Symposium on Computers and Communication IEEE Computer Society, Jul. 2000.

Keller, "Dynamic Dependencies in Application Service Management," Proceedings of the 2000 International Conference on Parallel and Distributed Processing Techniques and Applications, Jun. 2000.

Kar, et al., "Managing Application Services Over Service Provider Networks: Architecture and Dependency Analysis," Proceedings of the 7th IEEE/IFIP Network Operations and Management Symposium, Apr. 2000.

Keller, et al., "Dynamic Management of Internet Telephony Servers: a Case Study Based on JavaBeans and JDMK," Proceedings of the 3rd International Enterprise Distributed Object Computing Conference, IEEE Computer Society, Sep. 1999.

Keller, Managing the Management: CORBA-based Instrumentation of Management Systems,: Proceedings of the Sixth IFIP/IEEE International Symposium on Integrated Network Management, Boston, MA, USA, May 1999.

EPO Examination Report, European Application No. 02 763 549.9-2211, dated Dec. 4, 2008, 5 pages.

* cited by examiner

METHOD AND APPARATUS FOR MANAGING COMPONENTS IN AN IT SYSTEM

The present application is a continuation of U.S. application Ser. No. 10/021,535, filed Dec. 12, 2001 now U.S. Pat. No. 7,483,970, which is incorporated by reference in the present application in its entirety.

FIELD

The present invention relates generally to methods and systems for managing the applications and components of an integrated information technology or e-business computer system.

BACKGROUND OF THE INVENTION

Information technology (IT) and electronic business (e-business) solutions are important for business competitiveness and growth for many companies. An e-business or IT solution is typically a set of applications, or software packages, grouped together to solve a problem. A number of difficulties in IT systems and e-business solutions, however, can cause maintenance, planning, and management of these systems to be difficult. First, many IT systems are complex. Many IT systems use a large number of applications that can exist on a large number of servers in a variety of locations. In addition, a large number of participants can take part in an e-business solution. Many IT systems, therefore, have a large number of components that form sizeable e-business systems of potentially overwhelming complexity.

Complexity for some IT systems results because it is often difficult to determine what applications are running as part of the e-business solution, where those applications are running, and who is running those applications. Relationships also exist between two or more applications in which one application uses another application in some way. These relationships, or "dependencies," between applications are often difficult to determine. For example, common building blocks such as databases, web servers, and application servers can be used by many different applications. Knowledge of dependencies in a system can be important. The failure of one application due to a bug or system malfunction can cause a larger breakdown of an e-business system due to dependencies between the applications of the e-business system. Detailed knowledge of the organization of applications and the dependencies between applications can provide valuable insight into repairing system malfunctions, planning for future growth, and managing the IT system.

The rapid change of many IT systems can also make management of IT systems difficult. E-business solutions can change rapidly as technology changes and as the needs of the e-business solution are modified. New servers, databases, and applications can be added to upgrade a system or to improve performance. It can therefore become difficult and expensive to track and fix problems, modify the e-business solution, and plan for future growth.

A lack of information about large, complex systems can also make maintenance of IT systems difficult. The organization and information about a company's e-business system is typically locked up in the heads of one or more IT professionals within a company. The loss of knowledgeable IT personnel can make system management time-consuming and burdensome for personnel who are not familiar with the entire structure of the IT system.

SUMMARY OF THE INVENTION

The invention features a method and apparatus for managing components in an IT system. Under one aspect of the invention, the method features discovering components in the IT system, determining at least one dependency between two or more of the discovered components, and tracking changes to the discovered components and the dependency between two or more of the discovered components. The discovery of components can be carried out using fingerprints of components. These fingerprints can include key elements of the component that exist in a full model of all of the elements of the component. Refined components, which are components that relate in some manner to another component (that is, the refined component is a specific version of the component or an optional piece that can be included with the component), can be discovered using subfingerprints that are activated upon the discovery of the component. A dependency is a relationship between two or more components in which one component uses another component in some way, or in which one component requires the existence of another component. After a component has been discovered, changes to the component can be tracked so that, for example, IT personnel can more readily identify system changes that might hamper performance of the IT system.

Under another aspect of the invention, after components have been discovered, a visual map of the IT system can be generated. The visual map can include depictions of the discovered components and the dependencies between the discovered components.

Under another aspect of the invention, an agent for collecting information on components in an IT system is provided. The agent can be a module that resides on a server in the IT system, and the agent can feature an observer module to detect event information about the elements of the server and an analysis module to process the event information. The analysis module can include (1) component discovery rules to process event information and match event information with elements of one or more fingerprints of known components using an accumulator, and (2) dependency discovery rules to discover relationships between components of the IT system.

Under another aspect of the invention, a network server can be used along with a plurality of agents, such as those described above. Each agent can be installed on a separate server of the IT system, and each agent can have the capability of discovering components that are local to the server on which the agent is installed. The agents can then transmit information regarding events and discovered components to the network server, where the information can be further processed to discover components that span more than one server and to discover dependencies between components that exist on separate servers.

Under yet another aspect of the invention, changes to components and dependencies in an IT system are tracked. In this embodiment, the method features generating a discovery message upon the discovery of an existing component in the IT system, retrieving a list of elements of the existing component to track for changes, and transmitting a message to an observer module to begin tracking changes for the elements in the list.

DETAILED DESCRIPTION OF THE EMBODIMENTS OF THE INVENTION

Figure 1:
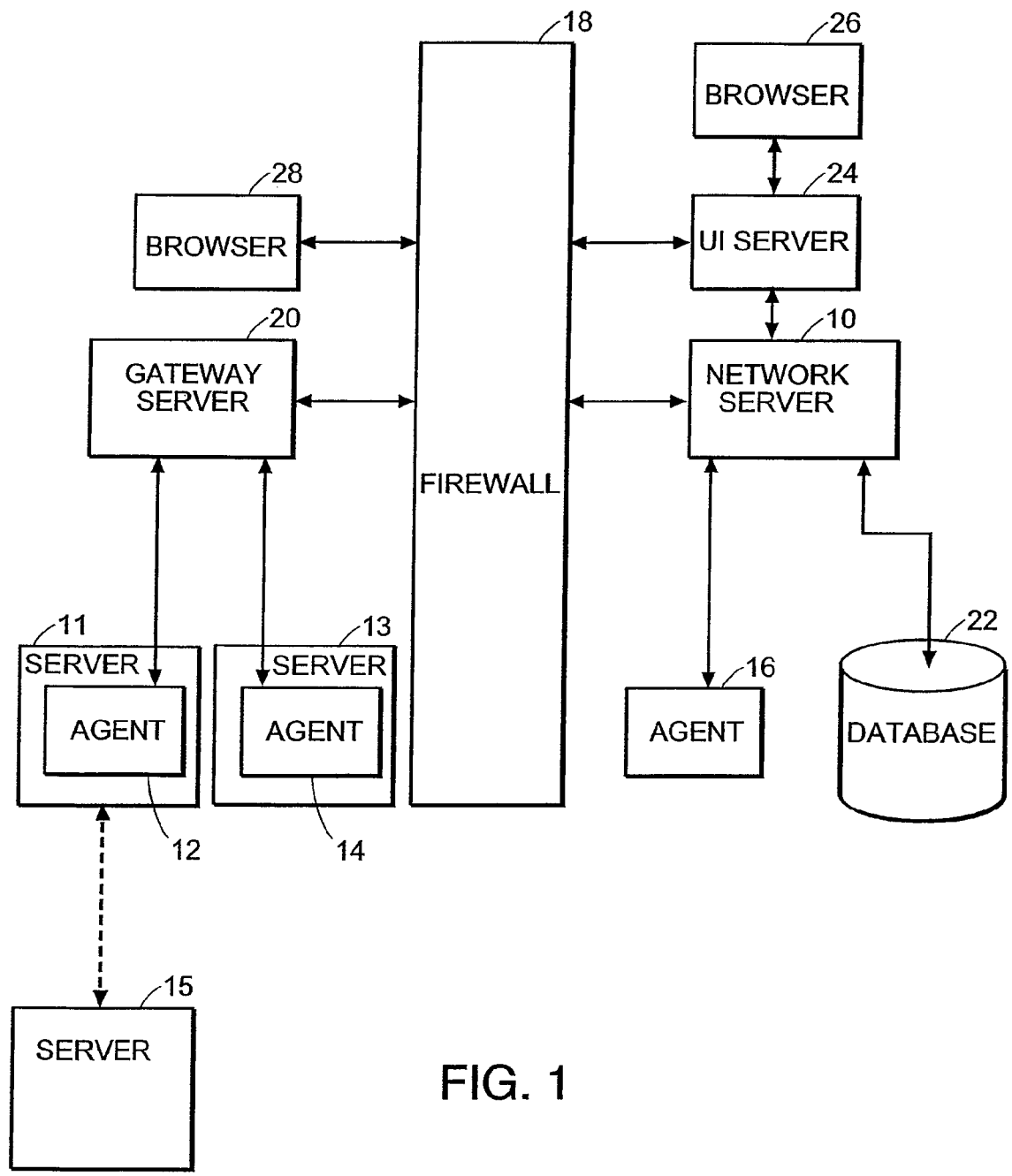
FIG. 1 is a block diagram of a representative network in which the system can be implemented in one embodiment.

The embodiments described herein provide methods and devices for managing the hardware and software platforms and building blocks of an integrated information technology (IT), e-business solution, or computer system. Very briefly, a set of agents on servers of the system is used to collect system event information by detecting low-level items in the IT system. Events are occurrences in the IT system, such as file or registry creations, modifications, or deletions, or the discovery of such components in the IT system. This event information is analyzed within the agents to filter out unneeded event information, such as minor file modifications that do not affect the system. The event information is then analyzed in an agent or in a network server that receives information from all or a subset of the agents of the IT system. The components of the IT system are therefore discovered, and changes to these components are tracked after discovery. In addition, dependencies, which are relationships between components, can be determined. A visual map of the IT system can then be created using the event information, and this visual map can be updated as the IT system changes. The visual map can be used to locate and track system problems, help in developing system modifications, and aid in procuring the necessary hardware for proper system performance.

As used throughout this specification, the term "component" refers to any item that can be detected, discovered, and/or tracked in an IT system. These items include the low-level items in an IT system such as files, directories, and registry settings, hardware of the system, database metadata, shared libraries, and Dynamic Link Libraries ("DLLs"), and also the higher-level components such as the applications of the IT system, along with other items. The term "application" will be used to refer to a component that is a piece of software for an identifiable product. One application can therefore contain many components. Examples of applications include an Apache web server, an Oracle database, Microsoft® Word, and a collection of web pages and instructions for managing a stock portfolio. An application can exist on one server or can be spread across multiple servers. One application can include a number of other applications. Microsoft® Office, for example, is an application that can include a number of other applications, such as Word and Excel. Such an application can also be called a solution, which is a set of applications grouped together to provide a specific solution to a specific problem.

Discovery of components can generally be either reactive or proactive. Reactive discovery is when an agent in the system is notified that an application or component has been installed, modified, or deleted, or is provided with real-time messages regarding the creation of components to permit the agent to determine that an application or component has been installed. In reactive discovery, the method and system react in real time to event information in messages received from the observers and the operating system as discussed below. This event information can be used to attempt to match fingerprints for discovery. In any case, as discussed in connection with the observers, the system and method can use features of the server's operating system to detect events in real time.

Proactive discovery, on the other hand, is used when an agent is installed on an existing system, when a system has restarted, or when further information about the system is needed. In proactive discovery, the agent proactively scans or "crawls" the system to detect key files, registry entries, directory structures, and other information that will allow it to detect an installed component or application. Proactive discovery can be used to step through the files on the system to determine what is present. The detected files, registry entries, and directory structures can be used to match the fingerprints of the system to discover components. In other embodiments, a map of the system can be saved so that the components of the system before a crash are known. If, after the fingerprints have been used to discover components on the system, the persist map is different from the actual components that have been discovered, the system differs from before the crash or the happening that caused the proactive scan.

A. System Architecture

FIG. 1 is a block diagram of a representative network in which the invention can be implemented. The network includes a network server 10 and a plurality of agents 12, 14, 16 that communicate either directly or indirectly with the network server 10. Generally, one or more agents exist on each server 11, 13 for which management is desired and that is used by the IT system. It is also possible, however, for an agent to remotely monitor a server. FIG. 1, for instance, shows agent 12 remotely monitoring sever 15. The IT system, as a whole, includes all of the computers, servers, and databases used by an e-business solution. Each server can be any computer or computer system, including a router, local director, or database system. The agents 12, 14, 16 collect and process system event information, which can then be communicated to the network server 10. Although FIG. 1 shows one network server 10, multiple network servers 10 can exist. In the network of FIG. 1, a firewall 18 separates agents 12, 14 from the network server 10. In one embodiment, a gateway server 20 exists in the same firewall segment as agents 12, 14 so that the agents 12, 14 can communicate with the gateway server 20, which is nearby. In other embodiments, a gateway server 20 is not used. The gateway server 20, if used, sends the event information received from agents 12, 14 to network server 10. In this manner, only server-to-server communications need be firewall friendly.

The event information received by the network server 10 is stored in network database 22. This event information can then be accessed by users through a user interface (UI) server 24 by using a browser 26, which can be any available browser, such as Netscape® Navigator or Microsoft® Internet Explorer. It is also possible, in one embodiment, to use a browser 28 to access information through the firewall 18 to UI server 24.

1. The Agents

The term "agent" will be used throughout this specification to refer generally to a program module that resides on a server to be managed and that collects and analyzes event information that describes occurrences on the server of the IT system. The events monitored by an agent can include file creation, deletion, or modification, registry creation, deletion, or modification, network termination point creation, network outbound request creation, local directors, DNS information, SMTP information, database system information, security-related changes, and information regarding other components. A registry is a database used by the Microsoft® Windows operating system (such as Windows 2000, XP, or NT) to store configuration information. Typically, at least one agent exists on each server or operating system of the IT system for which management is desired to monitor the server/system and collect relevant event information. Each agent therefore can monitor the events of the specific server or system on which it is installed. In other embodiments, an agent can also monitor a server upon which the agent does not reside, as shown by agent 12 and server 15 in FIG. 1. As an example, a database server need not have an agent installed on it in order to monitor the database metadata, which can be monitored remotely. Although FIG. 1 depicts three agents 12, 14, 16, the number of agents used within an embodiment will vary with the size and structure of the IT system.

In addition to collecting event information, the agents 12, 14, 16 can discover components on the IT system that are local to the particular agent. If, for instance, Microsoft® Word exists on a server 11 running agent 12, agent 12 can discover and track changes to the Microsoft® Word application. Components that span more than one server, however, cannot typically be discovered or tracked using a single agent. For this reason, event information is passed on to the network server 10, where event information from more than one agent can be processed. Web sites that retrieve information from multiple servers, for instance, are examples of applications that span multiple servers and can be discovered at the level of the network server 10. Because both the agents 12, 14, 16 and the network server 10 receive event information, discover components, and track changes, the architecture of agents 12, 14, 16 and the network server 10 can, in one embodiment, be similar.

Figure 2:
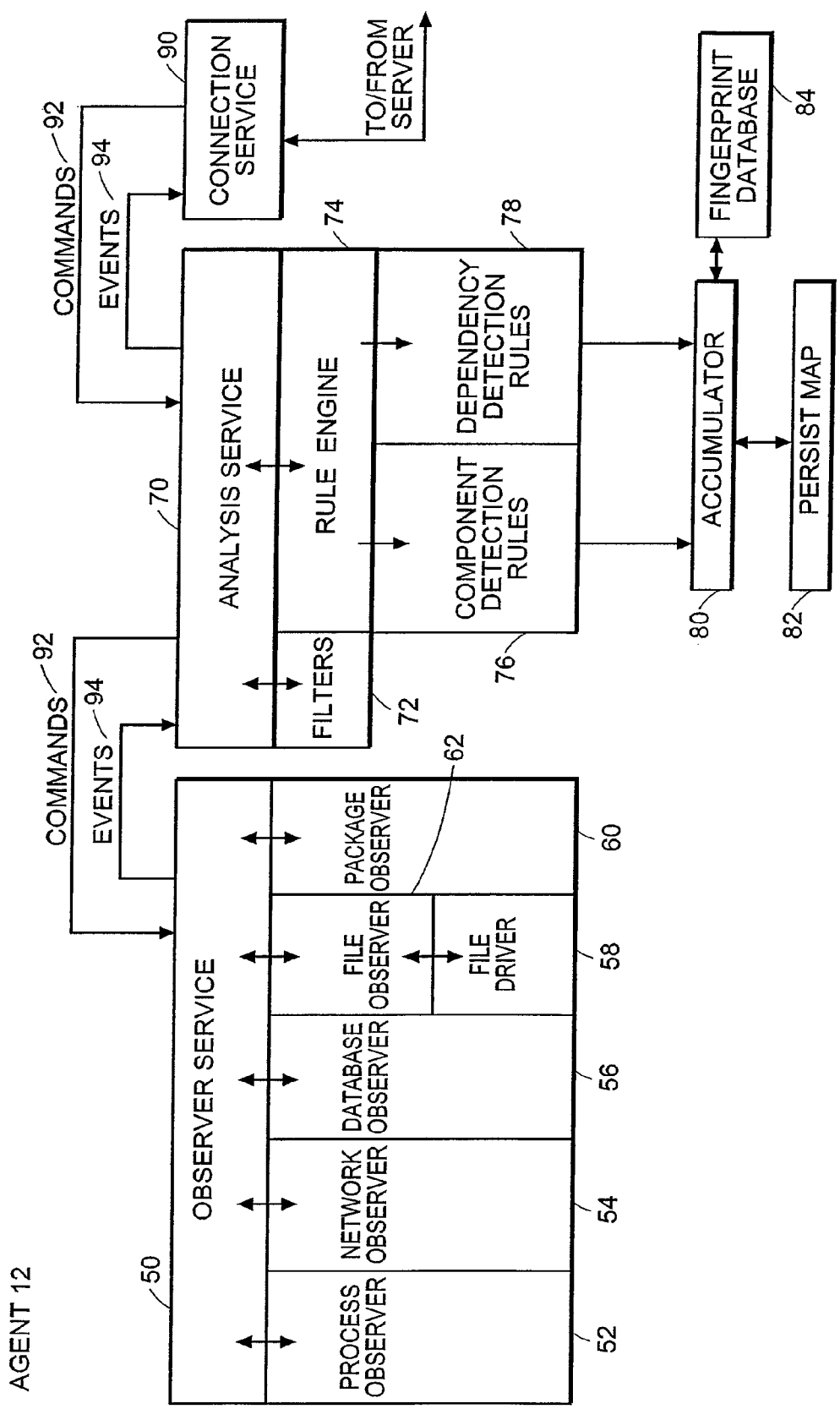
FIG. 2 is a block diagram of one embodiment of the architecture of an agent in the system of FIG. 1.

FIG. 2 is a block diagram that depicts the core services of one of the agents 12, 14, 16 of FIG. 1 in one embodiment. In general, the purpose of the agents 12, 14, 16 is to collect event information, perform low-level processing of the event information, and send the event information to the network server 10 (through the gateway server 20 in an embodiment having a gateway server 20). In the embodiment of FIG. 2, the agent 12 includes an observer service 50, an analysis service 70, and a connection service 90. The connection service 90 handles communications between the agent 12 and the network server 10 (or the gateway server 20) and ensures that communications are secure. The connection service 90 receives event messages generated on the observer service 50 through the analysis service 70 for communication to the network server 10. In addition, the connection service 90 receives commands from the network server 10 for communication to other services of the agent 12, as depicted in FIG. 2.

The observer service 50 is responsible for loading and configuring a set of observers that can be used to collect event information. An observer is a piece of code that determines if an event has occurred that is significant to the IT system, generates a message describing the event, and passes the message to the agent 12 for further processing. Such events can be detected in real time as they occur or can be generated in a systematic "crawl" through a directory or server to collect information that already exists. Observers, therefore, "detect" the low-level items in the IT system or subsystem. An observer can also filter event information to exclude certain events that are not of particular importance so that those events are not passed on to the analysis service 70. The code of an observer interfaces with the host operating system, device drivers, databases, and other components of the server 11 on which the agent 12 is installed to detect events. In one embodiment, different observers can be used to detect different component classes of the server 11. For example, a first observer can be used to monitor the operating system, a second observer can be used to monitor a first database, a third observer can be used to monitor a second database, a fourth observer can be used to monitor a first device driver, and so forth.

As noted above, the observers generate messages having event information that describe an event upon the occurrence or detection of the event. FIG. 2 depicts the transmission of event information 94 in messages between the observer service 50 and the analysis service 70. FIG. 2 also depicts the transmission of commands 92 from the analysis service 70 to the observer service 50. These commands 92 are requests that a particular function be performed or that more information be gathered for analysis. An example of such a command 92 is a request that a detailed description of a file, such as the file size and creation date, be retrieved and returned to the analysis service.

FIG. 2 depicts a number of observers running on agent 12. These observers include process observer 52, network observer 54, database observer 56, file driver 58 and file observer 62, and package observer 60. The observers 52, 54, 56, 60, 62 depicted in the observer service 50 of FIG. 2 are exemplary, and other observers can be used within the scope of the invention. In addition, multiple observers of the same type can be used to monitor different events.

The file driver 58 and file observer 62 can be used to monitor file creations, deletions, and modifications. In one embodiment, the file observer 62 and file driver 58 are implemented as described below. Numerous other implementations can also be used. A Solaris version of the file driver 58 can be implemented such that an interface is exposed to the file observer 62 through a pseudo device. Information regarding Solaris internals and pseudo devices is provided in *Writing Device Drivers*; Sun Microsystems, Inc.; February 2000; Part Number 805-7378-10; and Jim Mauro & Richard McDougall, "*Solaris Internals*," Sun Microsystems Press (2001), ISBN 0-13-022496-0, p. 44-46, 513-564, 257-343. After load and initialization, the file driver 58 hooks into the sysent table by saving key system call function pointers and replacing them with the intercept code that allows the file driver 58 to intercept hooked calls. The calls of interest can include creat, creat64, open, open64, close, fork and exec, among others.

For this embodiment of file observer 62, Solaris calls the intercept code that allows the driver 58 to intercept hooked calls when an application initiates a system call. At this point, if the intercepting function is enabled, it gathers data about the underlying storage device (i.e., physical, virtual, or network), full pathname of the file or directory, and supplied flags to the system call. To gather this data, the file driver 58 uses the virtual file system, vnode and process constructs supplied by Solaris. Once gathered, the file driver 58 compares this data with prerequisites, such as whether the WRITE flag is enabled or residing on a physical drive, to determine if the event is worth reporting. After the event passes these prerequisites, the file driver 58 collects further information relevant to the event, such as fd, pid, ppid, uid and size, before passing it on to the file observer 62 in the agent. After an event has been passed to the file observer 62, the file observer 62 translates the message to a common internal format before determining if further processing is necessary or if the event can be sent straight to the analysis service 70.

The file observer 62 can generate a variety of messages regarding events in the system. These messages can, for example, include messages indicating that a file exists, has been modified, or has been deleted. The file observer 62 can also respond to certain commands generated by the analysis service 70. These commands to which the file observer 62 responds can include commands to crawl through a specified directory to collect event information, a command to retrieve details about a file, a command to copy a file, and a command to filter certain information. The file observer 62 can also generate messages in response to the commands indicated above, such as a message providing details about a file in response to a command message or a message indicating that a file has been copied in response to a command message.

The process observer 52 generally collects information on processes in the system that can be used to determine dependencies between certain components. Such processes, for example, can include the use of a file or application that already exists on the system. In one embodiment, a Solaris version of process observer 52 can be implemented such that an interface is exposed to the process observer 52 through a pseudo device. After load and initialization, a driver hooks into the sysent table by saving system call function pointers and replacing them with the intercept code that allows the driver to intercept hooked calls made by applications. The calls of interest can include fork, exec, and exit, among others.

The processes of concern for this embodiment of process observer 52 are generally created by calling one of the members of the fork or exec family of routines. Once an application initiates a system call, the intercept code that allows the driver to intercept hooked calls gathers information about the full pathname executable, fd, pid, ppid, uid and supplied parameters. To gather this information, the driver uses information stored about the process through the virtual file system (vfs), vnode and process constructs supplied by Solaris. Due to the nature of certain system calls, such as the exit call, information can be stored so that subsequent system calls can fill the message expected by the analysis service 70. For instance, whenever an exec occurs, the full pathname is saved using the pid as the key. This allows the process observer 52 to send the full pathname when the exit occurs, which normally does not contain the full pathname. After information has been collected by the process observer 52, it is sent to the analysis service 70.

The process observer 52 can generate a variety of messages regarding events in the system. These messages can, for example, include messages indicating that a process exists or has been deleted. The process observer 52 can also respond to certain commands generated by the analysis service 70. Such commands can include, for example, a command to retrieve details about a process. The process observer 52 can also generate messages in response to commands, such as a message providing details about a process.

The network observer 54 generally gathers socket information and forwards this information for analysis. The network observer 54 can be used to detect outbound network connections and inbound network listeners that can be used in the discovery process. In one embodiment, a Solaris version of network observer 54 can be implemented such that an interface is exposed to the network observer 54 through a pseudo device. After load and initialization, a driver hooks into the sysent table by saving system call function pointers and replacing them with the intercept code that allows the driver to intercept hooked calls made by applications. The calls of interest can include socket, bind, listen, accept, connect and close, among others.

In this embodiment of the network observer 54, once an application initiates a system call, the intercept code that allows the driver to intercept hooked calls determines the relevance of the event based on characteristics such as ip address, port number, and supplied flags. If the event meets relevant requirements, the driver collects further information, such as fd, pid, ppid, uid, remote ip and port number before passing it on to the network observer 54 in the agent. The network observer 54 can then determine if the event is relevant, and, if so, pass it on to the analysis service 70.

The network observer 54 can generate a variety of messages regarding events relating to network connections in the system. These messages can, for example, include messages indicating that a network connection exists or has been deleted. The network observer 54 can also respond to certain commands generated by the analysis service 70. Such commands can include, for example, a command to retrieve details about a network connection. The network observer 54 can also generate messages in response to commands, such as a message providing details about a network connection.

The database observer 56 communicates with a relational or other type of database using an appropriate method, such as Oracle OCI libraries, MS SQL Server DB-LIB, or a vendor's Java Database Connectivity (JDBC) driver. The database observer 56 generally scans the metadata in the database and reports this information through events to the analysis service 70. The metadata can include the definition of tables, columns, constraints, triggers, stored procedures, permissions, ownership, and other information. This information can be used to track changes to the database metadata, which allows an event message about these modifications to be generated. The database observer 56 can be used primarily for tracking changes to components in the IT system.

The database observer 56 can generate a variety of messages regarding events relating to databases in the system. These messages can, for example, include messages indicating that a database schema exists, has been modified, or has been deleted. The database observer 56 can also respond to certain commands generated by the analysis service 70. Such commands can include, for example, a command to retrieve details about a database schema. The database observer 56 can also generate messages in response to commands, such as a message providing details about a schema.

The package observer 60 interfaces with operating system specific repositories of known installed applications, which are sometimes referred to as installed packages. For a Solaris embodiment, this repository is the package database as defined by the pkginfo command. Typically, these operating system repositories are incomplete in that they only contain a partial list of installed applications. For the set of applications that the operating system indicates as being installed, the package observer 60 can generate an event message to be sent to the analysis service 70 regarding the applications. Such a message, for example, can be a message indicating that an installation exists. The analysis service 70 can then verify whether the application exists through the discovery methods detailed throughout this specification.

A number of other observers that are not shown in FIG. 2 can also be used. Some of these observers include platform observers, domain name service (DNS) observers, load balancer observers, and registry observers. A platform observer is an observer that collects information regarding the server hardware and operating system. Generally, such an observer generates an event message with information about the hardware and operating system and sends it to the analysis service 70. The server hardware information that is collected can include the total RAM memory, the architecture type (i.e., Intel x86, Sun Sparc, etc.), the number of CPUs, the speed of CPUs, information regarding the hard disks (number, sizes, etc), information regarding local and remote mounted file systems, and information regarding network adapters, such as IP and MAC addresses. The operating system information can include the vendor of the operating system, such as Microsoft® or Sun, the operating system version, the installation directory(ies), and the patch level.

A DNS observer retrieves the DNS names that correspond to the IP addresses in use by an IT organization and reports this information to the analysis service 70. The DNS observer communicates with a DNS server using appropriate industry standard protocols. This allows the network server 54 to organize the managed servers 11, 13, 15 by both the numeric IP address, as reported by a platform observer, and the corresponding DNS names used when interacting with the managed servers 11, 13, 15.

A load balancer observer communicates with various Layer-4/load balancer switches, such as a Cisco LocalDirector, to collect mapping information. The primary role of the load balancer observer is to retrieve the Universal Resource Locators (URLs) to network IP address translation mappings, and report this information to the analysis service 70. This allows the network server 10 to organize the managed servers 11, 13, 15 by both the numeric IP address as reported by the platform observer and the corresponding URL's that are commonly used when interacting with the managed servers 11, 13, 15.

A registry observer generates messages regarding changes to a Microsoft® Windows registry database. These messages can, for example, include messages indicating that a registry key exists, has been modified, or has been deleted. The registry observer can also respond to certain commands generated by the analysis service 70. These commands to which the registry observer responds can include commands to crawl through the registry keys beginning at a certain registry key to collect event information, a command to retrieve details about a registry key, a command to copy a registry key, and a command to filter certain registry information. The registry observer can also generate messages in response to the commands indicated above, such as a message providing details about a registry key in response to a command message or a message indicating that a registry key has been copied in response to a command message.

The analysis service 70 of the agent 12 of FIG. 2 processes the event messages generated by the observer service 50 to detect components, track changes to components, and discover dependencies between components on the local agent 12. Generally, a dependency is a relationship or association between two or more components in which one component uses another component in some way, or in which one component requires the existence of another component, such as another application, database, or piece of hardware, in order for the component to function properly. In the embodiment of FIG. 2, the analysis service contains filters 72, a rule engine 74, component detection rules 76, dependency detection rules 78, an accumulator 80 and persist map 82 (any storage device), and a fingerprint database 84.

The analysis service 70 can, in one embodiment, use fingerprints to analyze event information to determine if any of the components in the fingerprint database 84 exist on the server 11 of the agent 12. As will be described in more detail below, the accumulator 80 can be used to determine if all of the elements of a fingerprint exist, which indicates the presence of the component indicated by that fingerprint. The rule engine 74, along with the component detection rules 76 and dependency detection rules 78, contain the instructions used for the discovery and tracking procedures. The functions of the analysis service 70 will be described in greater detail below.

2. The Network Server

Figure 3:
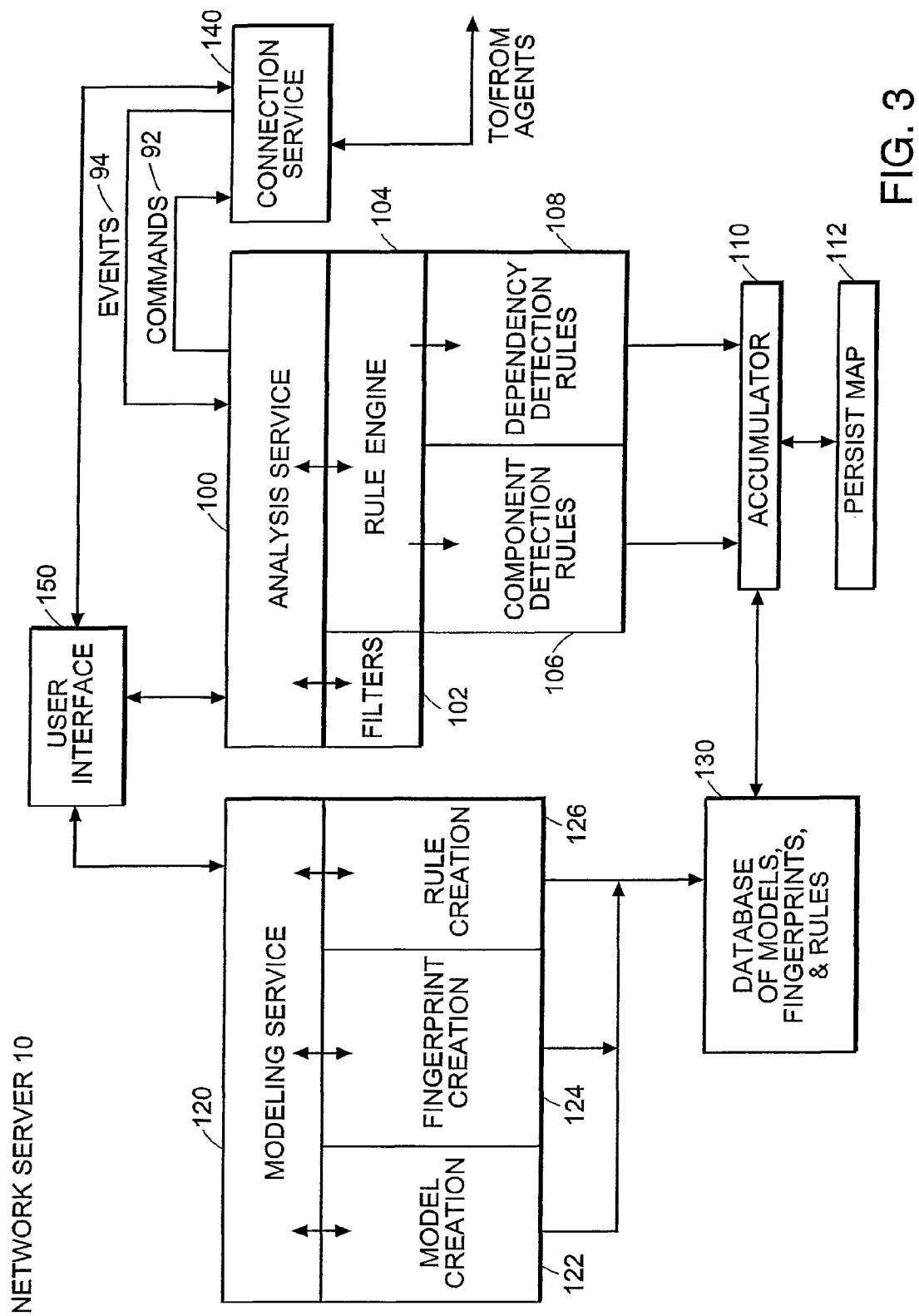
FIG. 3 is a block diagram of one embodiment of the architecture of the network server in the system of FIG. 1.

FIG. 3 is a block diagram that depicts the core services of the network server 10 in one embodiment. The architecture of the network server 10 can be similar to the architecture of the agent 12 described above in connection with FIG. 2. The network server 10, for instance, contains a connection service 140 and an analysis service 100. Each of these services provides substantially the same functionality as the corresponding services within the agent 12. For instance, the connection service 140 handles communications, including event messages and commands between the agents (or the gateway server 20) and the network server 10 and ensures that communications are secure. Unlike the architecture of the agents, the network server 10 does not typically contain an observer service. This is because the network server 10 collects event information from a number of agents, which each contain an observer service 50. The network server 10, however, does contain a user interface service 150 in one embodiment, as well as a modeling service 120. The user interface service 150 allows a user to interact with the system to monitor components and changes to the components that have been tracked.

The modeling service 120 allows for the creation of models that can be used in discovery along with fingerprints, as will be described in more detail below. The modeling service 120 contains a model creation service 122, a fingerprint creation service 124, and a rule creation service 126 that can create a database 130 of models, fingerprints, and rules.

The analysis service 100 of server 10 can be similar to the analysis service 70 of the agent 12 of FIG. 2. The analysis service 100 contains filters 102, a rule engine 104, component detection rules 106, dependency detection rules 108, and an accumulator 110 and persist map 112. The analysis service 100 of the network server 10 can discover components and dependencies that span more than one server. In addition, in some embodiments, the analysis service 100 of the network server 10 can also discover components that exist solely on a single server.

B. Model-Based Discovery

The system and method described herein can discover components in the IT system, determine dependencies between the components, generate a visual map of the components in the IT system, and then track changes to the discovered components and the dependencies between the components. The first step in one embodiment, therefore, is the discovery of components in the IT system, which determines what is installed and where it is installed.

Generally, a variety of discovery methods can be used within the scope of the invention. One discovery method that can be used, and will be described in greater detail below, is model-based discovery. As noted above, the observers of the agents (FIG. 2) collect event information in the IT system, and the event information is then analyzed by the analysis service 70. A first level of analysis takes place within the analysis service 70 of the agent 12, and a second level of analysis takes place within a similar analysis service 100 of the network server 10 (FIG. 3), as will be described in greater detail below. In both levels of analysis, models can be used in discovery.

In a model-based discovery method, a model is constructed that defines a component, such as an application, and all of its component items, such as files and registry keys. The model, therefore, is a collection of data that defines the presence and attributes of the elements of an application or component. Using the model, a matching set that describes key elements of the application can be generated. This matching set, which can also be called a fingerprint, is a subset of the model for the application or component that uniquely identifies it, and the matching set can contain information about the types of components, how the components should relate (for example, directory structures), and attribute information about the components, such as the size of a file. A fingerprint can contain, for instance, the directory structure and filenames of an application's files, the registry entries for the application (for Windows), and the contents of a few selected files or registry keys.

As an example of model-based discovery, the agent 12 or network server 10 can use a fingerprint to discover that an existing component has been installed on the IT system through the use of the accumulation of real-time event information or by inspecting the actual contents of the IT system to see if components are present that match the fingerprint of the model of a known component. If components are present that match the fingerprint of the known component, the existing component on the IT system is discovered. The term "known component" will be used in this specification to refer to a component whose elements are known and can therefore be modeled, whether that component exists on the IT system or not. An "existing component," on the other hand, will be used to refer to an actual component that is installed on the IT system or is being installed on the IT system.

As an example, a model for a component that is an application, such as Microsoft® Word, can first be generated. Such a model will contain a collection of all of the data that define the presence, attributes, and dependencies of the components, such as the filenames and directory structure of the files that make up Microsoft® Word. Because the model for Microsoft® Word will contain a large amount of data, a smaller subset of this data will be compiled into a fingerprint that can be used for discovery purposes. The fingerprint for Microsoft® Word, for instance, could contain the key executable files and data that make up and uniquely define Microsoft® Word. During a discovery process, information about a number of events (that is, file or registry entry creations or deletions) can be accumulated that form parts of the fingerprint for Microsoft® Word. When the last of these events is discovered, the fingerprint for Microsoft® Word has been matched and the existing Microsoft® Word component on the IT system has been discovered.

1. Model Generation

In a model-based discovery method, a model of the component is first generated so that a fingerprint can be created for use in discovery. A number of methods can be used to create models. FIG. 3 depicts a modeling service 120 in the network server 10 through which a user can interact to create a model for a component. The modeling service 120 contains a model creation service 122, a fingerprint creation service 124, and a rule creation service 126 that can be used to define rules for use during discovery. In the network server 10 of FIG. 3, fingerprints can be contained in the database 130 of models, fingerprints, and rules. In the agent 12 of FIG. 2, similarly, fingerprints can be contained within the fingerprint database 84.

A model of a component can be generated using a variety of methods, including using manual inputs, tracked installs, kit scans, or auto discovery. In each of these methods, the elements of a model for a component can be generated, and then these elements can be presented to the user for verification. A graphical user interface, for instance, can be used to present the elements to the user. The user can then check off elements that should not be used in the model so that the accuracy of the model can be controlled by the user.

A manual input method of model generation allows a person to select the items that make up a component from a list of files, registry keys, dependencies, and other items. One such manual input method, for instance, uses an installed instance of the application of the same type as a source of the file lists and registry keys. A user can then select all of the directories, files, and registry keys that make up an application in one manual input method of generating a model for a component.

A tracked install method of generating a model of a component, on the other hand, allows a person to denote the start and end of the installation of a component, such as an application. All of the files, registry keys, directory information, and other items that are created, modified, or deleted between the start time and end time of the installation can be considered parts of the application when building the application model. This list of parts can then be modified by the user to reduce the set of resources to be used by the application model. A user interface 150 (FIG. 3) can be provided to allow a user to denote the start and stop time of the installation of an application.

A kit scan is another method that can be used to generate a model for a component. A kit scan allows a kitted form of the component, such as an InstallShield image, to be processed, and the internal list of components used to create the application can be modeled. In addition, the uninstall log of an already installed application can be scanned. This uninstall log lists the actions taken to actually perform the installation, which can be a good source of input for a model. In this manner, a scan of the elements of the component are collected into a model of the component. This type of model, therefore, can be generated before the component is installed on the system. Kit scans can be performed for a number of components that might later be used on a system so that a model (and also a fingerprint) of the component will exist for the purpose of discovery.

Auto discovery is another method that can be used to generate a model to be used for discovery. An auto discovery method uses clues provided by the operating system to discover the elements of a component. These clues can include operating system pointers, process image file names, and framework knowledge. An operating system can contain pointers to files that make up an application. For example, Windows has registry entries that point to various pieces of an application, such as uninstall scripts. In addition, the operating system might contain a list of installed applications along with components of the application and dependencies. For example, the Windows Installer database, the Solaris packages database and the RedHat Linux RPM database can contain a list of certain installed applications. A model of each installed application can therefore be readily constructed from operating system pointers. In another embodiment, operating system pointers can be used to discover applications without first explicitly using the pointers to create models.

Process description clues used in auto discovery methods of model generation include the observance of processes running on the operating system that are loaded from files that can be tracked back to a directory. An examination of the executable image that a process is running can be used to identify the directory from which the process was launched. This allows for the determination of which package launched the process. An application can therefore be modeled by the directory and file structure that is present in the identified directories.

Framework knowledge clues used in auto discovery can be used to create a model for some application frameworks that have a standardized way to represent applications supported by the framework. For example, JSP implementations install applications within a WEBAPPS directory and Microsoft® ASP represents applications as directories that contain a global definition. An examination of the contents of these directories can therefore be used to create a model of the components.

2. Fingerprint Generation

After a model of a component has been created, a fingerprint, or matching set, of the model can be constructed. This fingerprint, which is a subset of the model for a known component, can be used to discover the presence of an existing component in the IT system. A model for a component, for instance, might contain hundreds of elements, but a fingerprint for the same component might contain only ten to twenty elements. Although use a model of a known component may be ultra-precise in the discovery of an existing component because a full bill of materials for the component will be matched, system constraints make the use of fingerprints containing a subset of the elements of a model beneficial.

A fingerprint can be constructed from a model in a number of ways. In one embodiment, all of the executable files of a model for a known component can be selected. In addition, the shared libraries and DLLs, which are libraries of executable functions or data that can be used by an application, can be selected, along with other elements that naturally define a component. Some percentage of these pieces can then be used in a fingerprint, and the pieces used should unambiguate the fingerprint so that it is unique for the component. In order to unambiguate the pieces for the fingerprint, the executable files can be assigned one weight, the shared libraries can be assigned another weight, and the DLLs can be assigned a third weight. In culling the pieces into a fingerprint, the weights can be used to ensure that key pieces of the component are included in the fingerprint. For example, the executable files can have the highest weights, which will ensure that they will be included in the fingerprint. The DLLs could have the next highest weights, which could ensure that a large number of DLLs will be included in the fingerprint.

As described above, a fingerprint contains a number of pieces that can be matched in order to discover a component. The pieces that can be discovered can be either passive elements or active elements. The term "passive element" will be used throughout this specification to refer to the elements of a fingerprint that are matched or checked off for the discovery of a component. These elements can also be referred to as low-level elements. "Active elements," on the other hand, are elements of a fingerprint that trigger further searching, matching of elements, or matching of other subfingerprints in discovery.

The passive elements of a fingerprint for an application can, in one embodiment, be a list of files that uniquely define the application. After all of these passive elements have been matched, one or more active elements can be used to further search for information that can identify a version of an application or other optional components that are commonly associated with an application. A "subfingerprint" is a fingerprint that is used by the active elements of a parent fingerprint to discover a "refined component," which can be either a specific version of the component defined by the parent fingerprint or an optional piece that might be contained under the application defined by the parent fingerprint. Typically, a subfingerprint will contain information that is more refined than the information contained in a parent fingerprint. For example, a parent fingerprint might contain a list of file names to search for, and the subfingerprint might contain not only file names, but the size of files as well. In addition, a subfingerprint can contain items that are not in the parent fingerprint.

Figures 4, 5A, 5B:
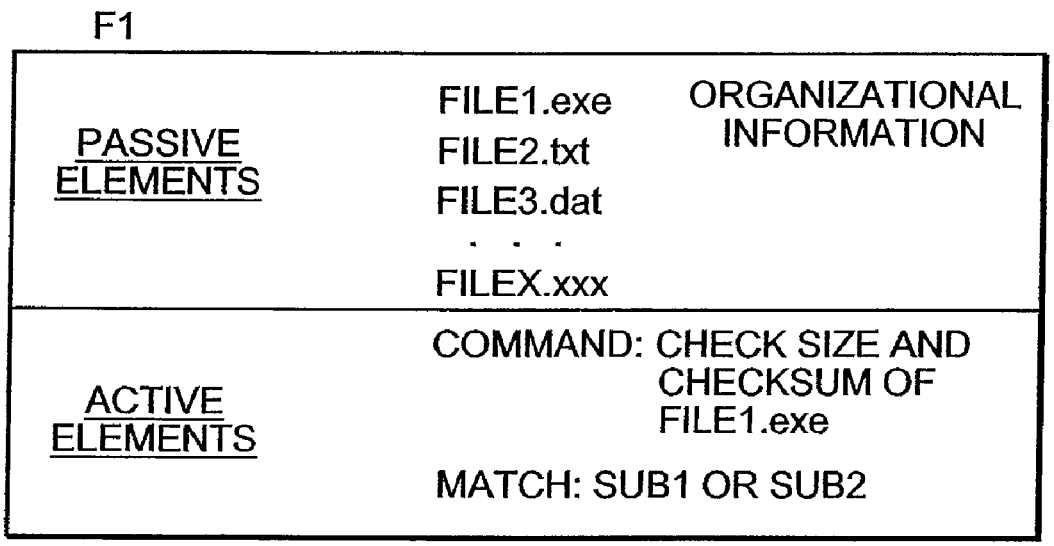
FIG. 4 is a depiction of a fingerprint for a component that can be used in one embodiment of the invention.
FIG. 5a is a depiction of a subfingerprint for a component that can be used in conjunction with the fingerprint of FIG. 4.
FIG. 5b is a depiction of a second subfingerprint for a component that can be used in conjunction with the fingerprint of FIG. 4.

In one embodiment, an active element might send a command to check the size and checksum of one or more files, and the result of this check could lead to the discovery of a certain version of an application. A fingerprint could, for instance, be generic for all or more than one version of a component. FIG. 4 depicts one sample fingerprint F1 that is generic to different versions of a component. The fingerprint F1 contains a number of passive elements, such as file1.exe, file2.txt, file3.dat, and organizational information, such as a directory structure, that uniquely identify more than one version of the application. After all of the passive elements of the fingerprint F1 have been matched, the active elements of fingerprint F1 might cause a command message (FIGS. 2 and 3 illustrate commands 92 in transit), such as a message to retrieve more detailed information, to be sent to an observer to retrieve the size and checksum of file1.exe and then to attempt to match one or more subfingerprints. One or more subfingerprints for fingerprint F1 can therefore exist, and these subfingerprints can be for different versions of the application. FIG. 5a depicts subfingerprint SUB1 and FIG. 5b depicts subfingerprint SUB2. These subfingerprints SUB1 and SUB2 for the different versions of the application can include information about the size and checksum of file1.exe, and a certain version of the application can be discovered upon the matching of this size/checksum information of subfingerprint SUB1 or subfingerprint SUB2.

In some embodiments, a single generic fingerprint may not be definable to uniquely identify all versions of an application. In such a situation, more than one parent fingerprint can be used to define the versions of the component. For instance, fingerprint F1 could be used for versions 1.0 to 1.9 of an application, and fingerprint F2 could be used for versions 2.0 to 2.9 of the application. Each fingerprint F1, F2 could contain its own list of active and passive elements for discovery, and each fingerprint F1, F2 could rely on different subfingerprints for the discovery of a specific version of the application.

In another embodiment, an active element of a fingerprint could send one or more commands that cause an attempt to match other fingerprints for optional pieces of a component. For instance, a fingerprint for Microsoft® Office might have a number of passive elements that are matched to indicate the discovery of the Microsoft® Office component. After these passive elements have been matched, an active element may cause the attempt to match one or more subfingerprints of the Microsoft® Office fingerprint. These subfingerprints could be for applications that commonly exist within Microsoft® Office, such as Microsoft® Word, Excel, or Spell Checker. The subfingerprints for these applications become active upon the generation of a message from an active element within the Microsoft® Office fingerprint, and this message causes the attempt to discover the components defined by these subfingerprints. In other embodiments, the subfingerprints can remain active at all times. In such embodiments, the elements of the fingerprint in addition to the elements of the subfingerprint would have to be matched in order to discover the refined component of the subfingerprint.

In some embodiments of the invention, fingerprints and subfingerprints can have multiple sets of elements used for different purposes. In one of these embodiments, fingerprints and subfingerprints can have three sets of elements: a detect set, a complete set, and a minimum set. When all of the elements in the detect set have been matched, the component of the fingerprint (or subfingerprint) can be considered to be installed. In this embodiment, the detect set can have only a portion of the elements necessary for a complete match of the component. In other words, when the elements of the detect set have been matched, the component can be considered to be installed, but the level of certainty that the component exists can be somewhat low. When the complete set is matched, the component can be considered to be fully installed so that it is known with certainty that the component has been installed. The minimum set comes into play when a component is removed or deleted from the IT system. Generally, when all of the elements of the minimum set have been removed and are no longer present in the IT system, the component can be considered to be uninstalled. Because a full removal of all of the elements of a component from the IT system does not always occur upon the removal or deletion of a component, the minimum set can contain fewer elements than the detect or complete set in some embodiments.

C. Dependency Discovery

After components of the IT system have been discovered, discovery of dependencies between different components of the system can be carried out. Generally, as discussed above, a dependency is a relationship or association between two or more components in which one component uses another component in some way, or in which one component requires the existence of another component, such as another application, database, or piece of hardware, in order for the component to function properly. After two components are discovered in the IT system, certain relationships (dependencies) between components can be discovered. These dependencies can be useful for an IT system administrator if one or more components of a system crash or are not functioning properly. If the relationship of those components to other system components is known, resolving problems in the IT system can be accomplished more easily.

A number of types of dependencies can exist between components in a system. One type of dependency is a shared library or object usage dependency. In such a dependency, the functionality of a first application is dependent on a second application if the second application exposes the first application through the use of a shared library, registry key, DLL, COM object, Java class, Inter-Process Communication (IPC), shared memory segments, or other service. The first application can, for instance, use the shared library, DLL, or other elements of the second application. A variety of dependency discovery methods can be used to discover these dependencies. Generally, event information can be received that indicates directory structures and other activities that can be examined to determine dependencies. For known applications, it is possible to match a process running in the system with the libraries and class files that were used to start the process. This, in turn, allows an agent to associate an operating system process with an application. In some instances, information regarding the operating system processes, shared libraries, registry keys, and other program and class files are available from the operating system. If one component uses the libraries, registry keys, or files of another component, a relationship exists between the components and one of the components is dependent upon the other component. In the agent 12 of FIG. 2, the process observer 52 and accumulator 80 can be used to discover these dependencies.

A second type of dependency is a network usage. In such a dependency, a first application is dependent on a second application if the second application uses resources that are exposed by a network connection, such as TCP/IP, by the first application. The second application's API, which is a set of routines, protocols, and tools used to build a software application, can, for instance, be called by the first application during execution of the first application. In general, in order to discovery network dependencies, outbound network connections are matched with network listeners so that the applications and servers in the dependency relationship can be determined. In the agent 12 of FIG. 2, the network observer 54 and accumulator 80 can be used to discover these dependencies.

A third type of dependency is a containment dependency. In a containment dependency, a first application executes a second application, and the second application is therefore dependent on the first application. In some configurations of containment dependencies, a first application contains a second application in the directory structure of the first application. In such a situation, the second application is dependent on the first application. In another configuration, a first application has pointers to a second application that resides outside the directory structure of the first application. In such a situation, the second application is dependent on the first application. Another containment dependency can be the existence of a component on a server In such a situation, the component depends on the server.

Discovery of containment dependencies can be accomplished using at least two approaches. In the first approach, the outermost application can be probed to determine the applications contained or used by that outermost application. For instance, code that interacts with the API of the outermost application can be used to find the active applications within the outermost application, and hence to discover the dependencies. Another approach is to model the containment association so that the dependencies can be inferred. For example, for a first application, any application stored in a particular directory of that first application can be considered to be contained within the first application. In addition, the model for a first application can describe a component of the first application that contains information about other applications that the first application will execute. This allows for the detection of which other applications are executed by the first application.

Figure 6:
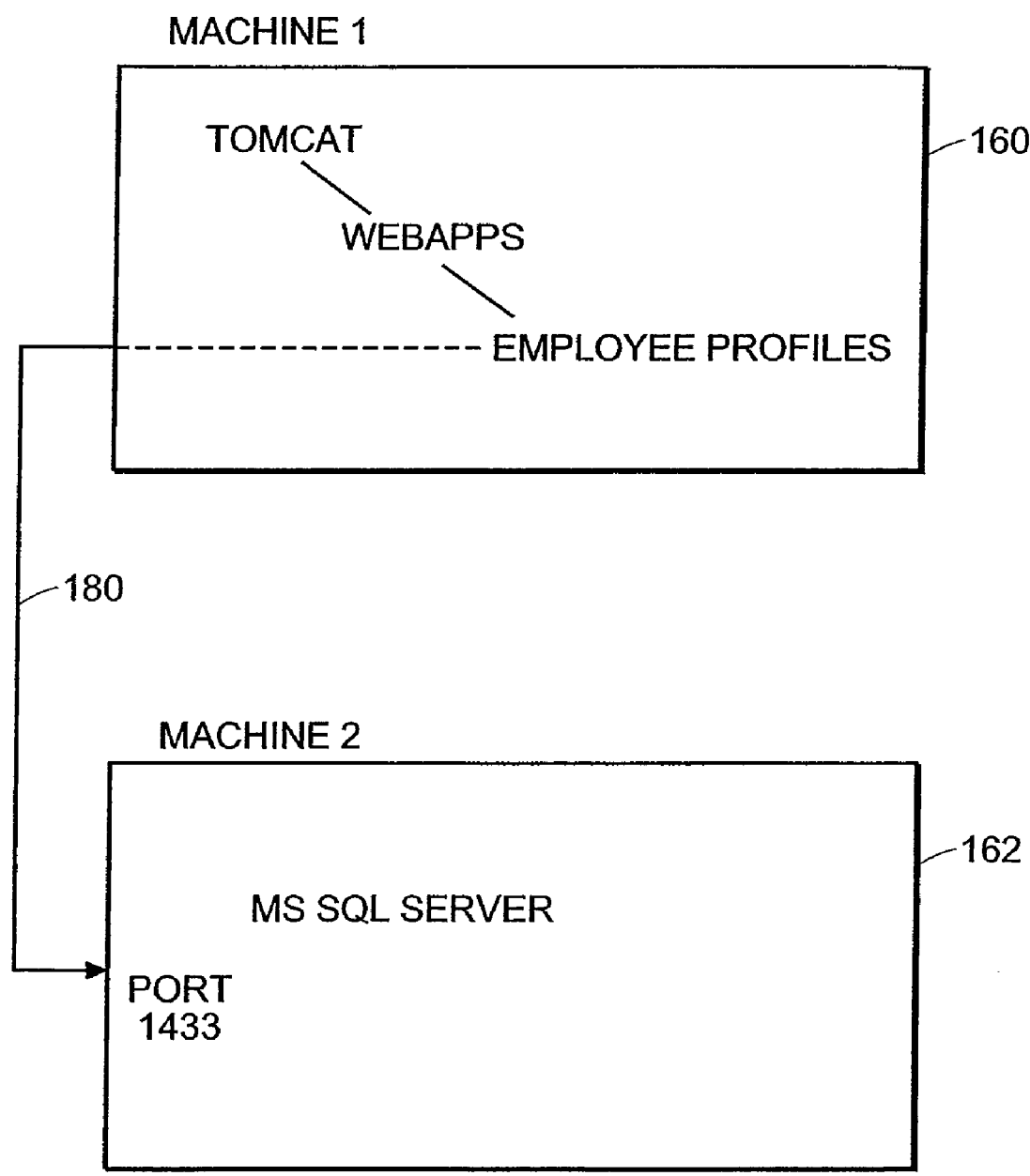
FIG. 6 is a block diagram that illustrates the discovery of network dependencies in one embodiment of the invention.

FIG. 6 is a diagram of two machines, machines 1 and 2, which are designated by numerals 160 and 162, that can be used to illustrate network and containment dependencies.

Machine 1 contains the TOMCAT application. The TOMCAT application contains the WEBAPPS directory, which contains the EMPLOYEE PROFILES application. The EMPLOYEE PROFILES application is contained within TOMCAT, and a containment dependency is present.

Discovery of network usage dependencies can use processes running on the IT system that establish network listeners to accept incoming network connections. These processes can also create outbound network connections to remote systems. By tracking these listeners and outbound connections, dependencies between systems and applications can be determined. Referring again to FIG. 6, a Microsoft® SQL server can be installed on machine 2 to listen for incoming connections on a certain port, port 1433, of the system. If a different application on machine 1 creates an outbound connection to port 1433 of machine 2, an agent can collect this information and can determine that a dependency exists between the two applications. The direction of the dependency is dictated by which application initiated the contact. In FIG. 6, the EMPLOYEE PROFILES application makes an outbound request 180 to port 1433 of machine 2, and therefore EMPLOYEE PROFILES is dependent on Microsoft® SQL server on machine 2. In the agent 12 of FIG. 2, the network observer 54 can be used to discover these dependencies. In one embodiment, inbound network requests can be ignored during discovery for efficiency purposes, and instead outbound requests can be monitored.

In discovering network dependencies, it is possible to discover which applications on the servers are dependent upon each other in a progressive manner. For instance, if an outbound network request is detected, a dependency between two servers can be discovered If it is known which applications are running on those servers, this information can be pieced together with the network connection information to determine the dependencies between specific applications on the servers.

Figure 7A:
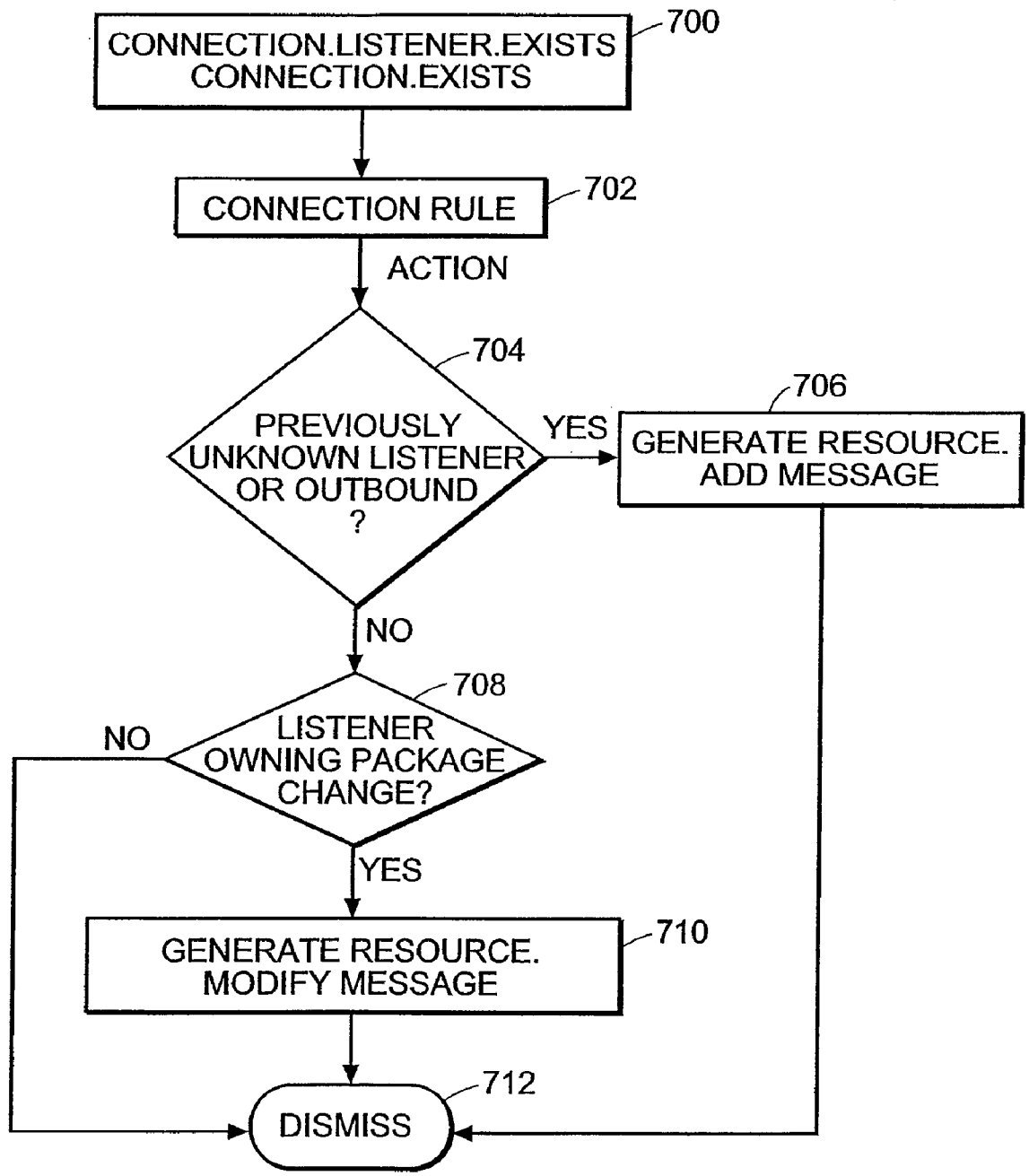
FIG. 7a is a flow chart illustrating the processing of network messages in one embodiment.

FIGS. 7a-7e are flow charts that illustrate embodiments that can be used to discover dependencies in an if system. FIG. 7a illustrates the processing of messages generated by the network observer 54 (FIG. 2). In particular, FIG. 7a at block 700 shows the processing of messages generated upon the establishment of outbound network connections and inbound network listeners. A connection rule (block 702) is used to process these messages. Initially, at block 704, a determination is made as the whether the outbound network connection or network listener is an unknown, or new, connection or listener. If the connection or listener is unknown, then a message indicating a resource usage is generated (block 706). A resource usage indicates that some resource, such as a network connection endpoint, file, registry key, component, or application, is being used by one of the components in the IT system. In the context of network outbound connections or network listeners, such a resource usage message can indicate the server making the outbound connection or network listener and the port used. As will be explained below in connection with FIGS. 7d and 7e, these resource usage messages can be used to discover components, such as software applications, that use the same resources and therefore have a dependency relationship.

If the network connection or listener is not new, then the connection or listener existed in the past. A determination can then be made as to whether the application using the listener or connection has changed (block 708). If there has been no change, the resource usage message previously generated for that network connection or listener need not be changed, and the connection or listener message is dismissed (block 712). If the application using the listener or connection has changed, a message is generated to modify the resource usage message previously generated for that resource usage to reflect the new application (block 710).

Figure 7B:
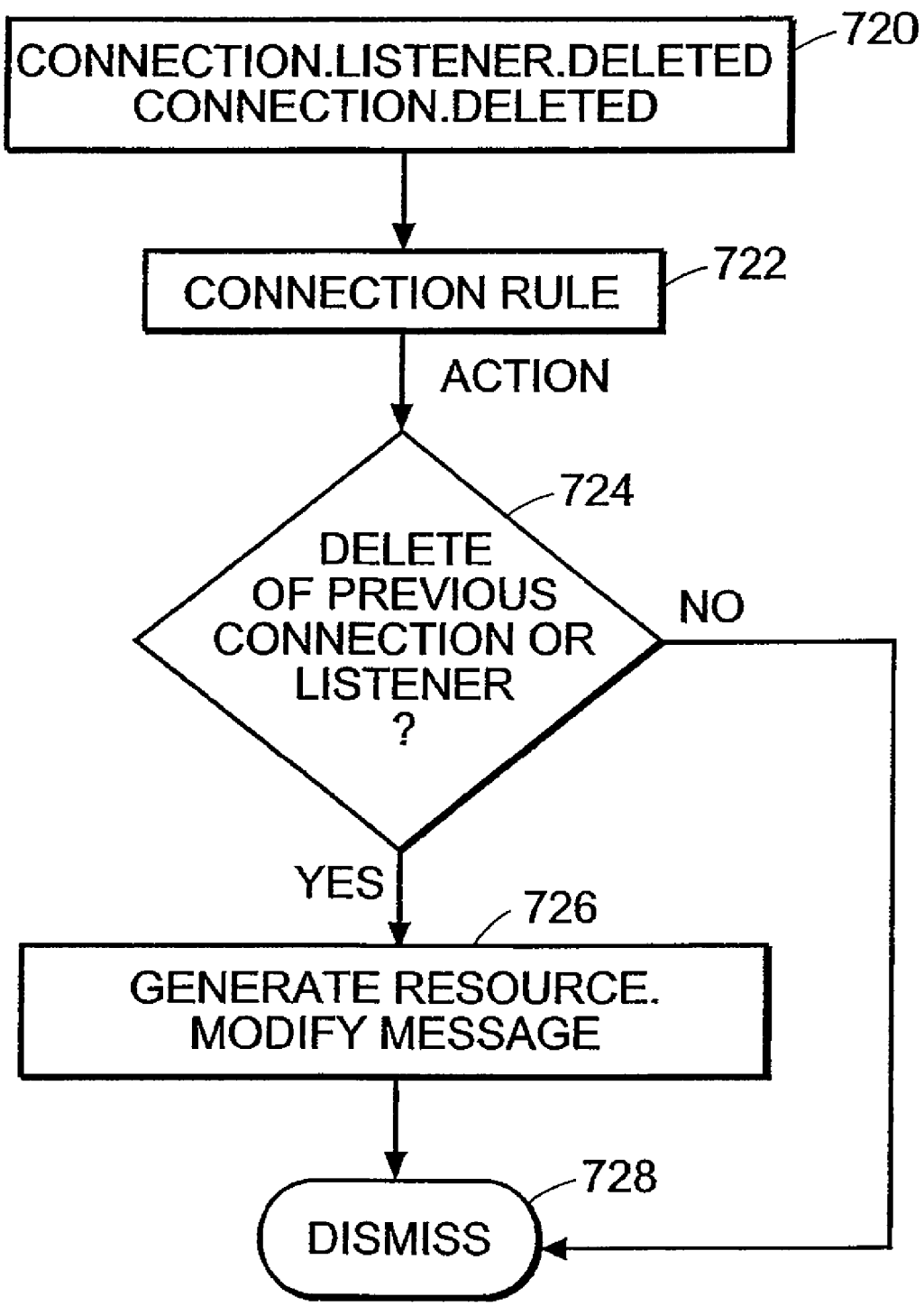
FIG. 7b is a second flow chart illustrating the processing of network messages in one embodiment.

FIG. 7b shows the processing of a network listener or connection deleted message (block 720), which can be generated by the network observer 54 (FIG. 2). The connection rule processes the message, as indicated by block 722 of FIG. 7b. Initially, at block 724, a determination is made as to whether the connection or listener being deleted corresponds to a connection or listener that has previously been detected. If the connection or listener has not previously been detected, the connection or listener deleted message is dismissed (block 728). If the connection or listener has previously been detected, a resource usage modify message is generated to indicate that the resource is not currently being used by an application.

Figure 7C:
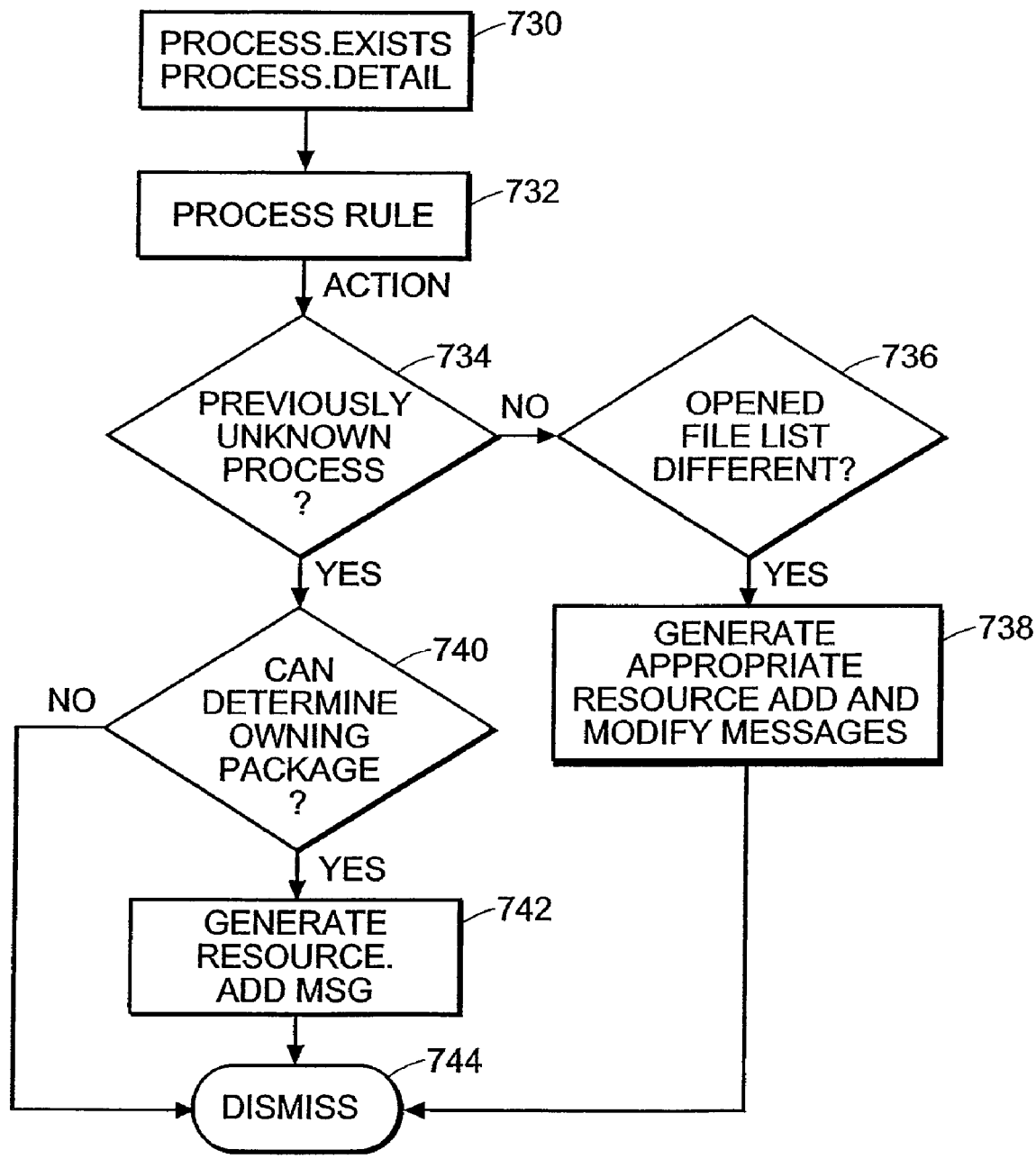
FIG. 7c is a flow chart illustrating the processing of process-related messages in one embodiment.

FIG. 7c illustrates the processing of messages generated by the process observer 52 (FIG. 2). In particular, FIG. 7c shows the processing of process exist and process detail messages (block 730) using a process rule (block 732). Initially, at block 734, a determination is made as to whether the process is an unknown or new process. If the process is not unknown (that is, if the process was known), a determination is made as to whether the list of open files used in running the process is different than the previous list of open files (block 736). If the current list of open files is different, for any files that are no longer open, resource modify messages are generated to indicate that those files are no longer in use (block 738). In addition, for any new files that are open, resource add messages are generated to indicate the usage of those files (block 738). Such a resource usage message can indicate, for example, the name of the resource being used (such as a file name, registry key, or network port), the application that owns the resource, and the application that is using the resource.

If the process is unknown, a determination is made as to whether the owning component (or application) can be determined. If this application cannot be determined, the message is dismissed (block 744) because it will not be useful in dependency discovery if the application using the resource is not known. If the component owning the process can be determined, a resource usage message is generated (block 742). The list of open files used by the process can be examined, and for each file that is not owned by the application, a resource usage message can be generated. Such a message can indicate, for example, the name of the resource being used (such as a file name), the application that owns the resource, and the application that is using the resource.

Figure 7D:
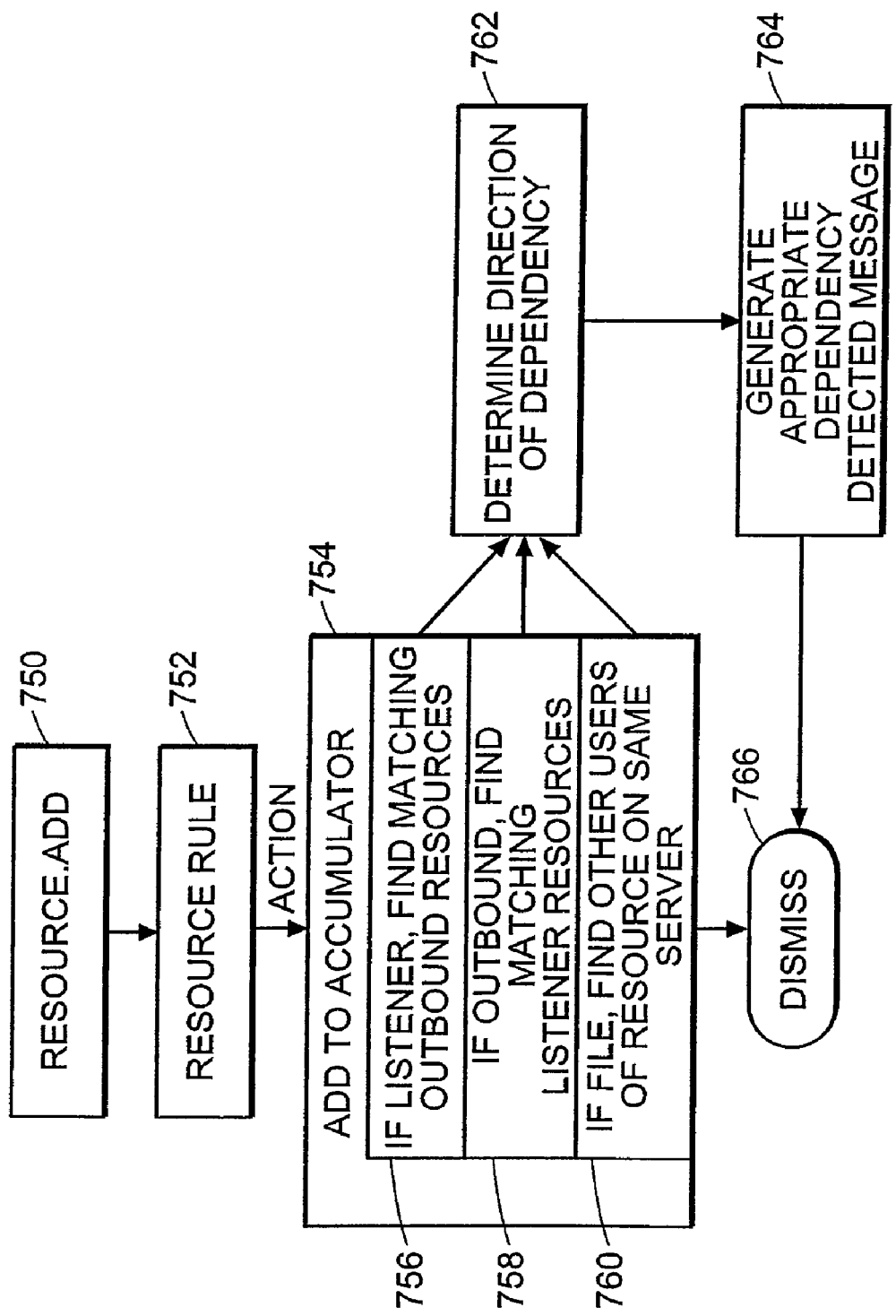
FIG. 7d is a flow chart illustrating the processing of resource messages to determine dependencies in one embodiment.
Figure 7E:
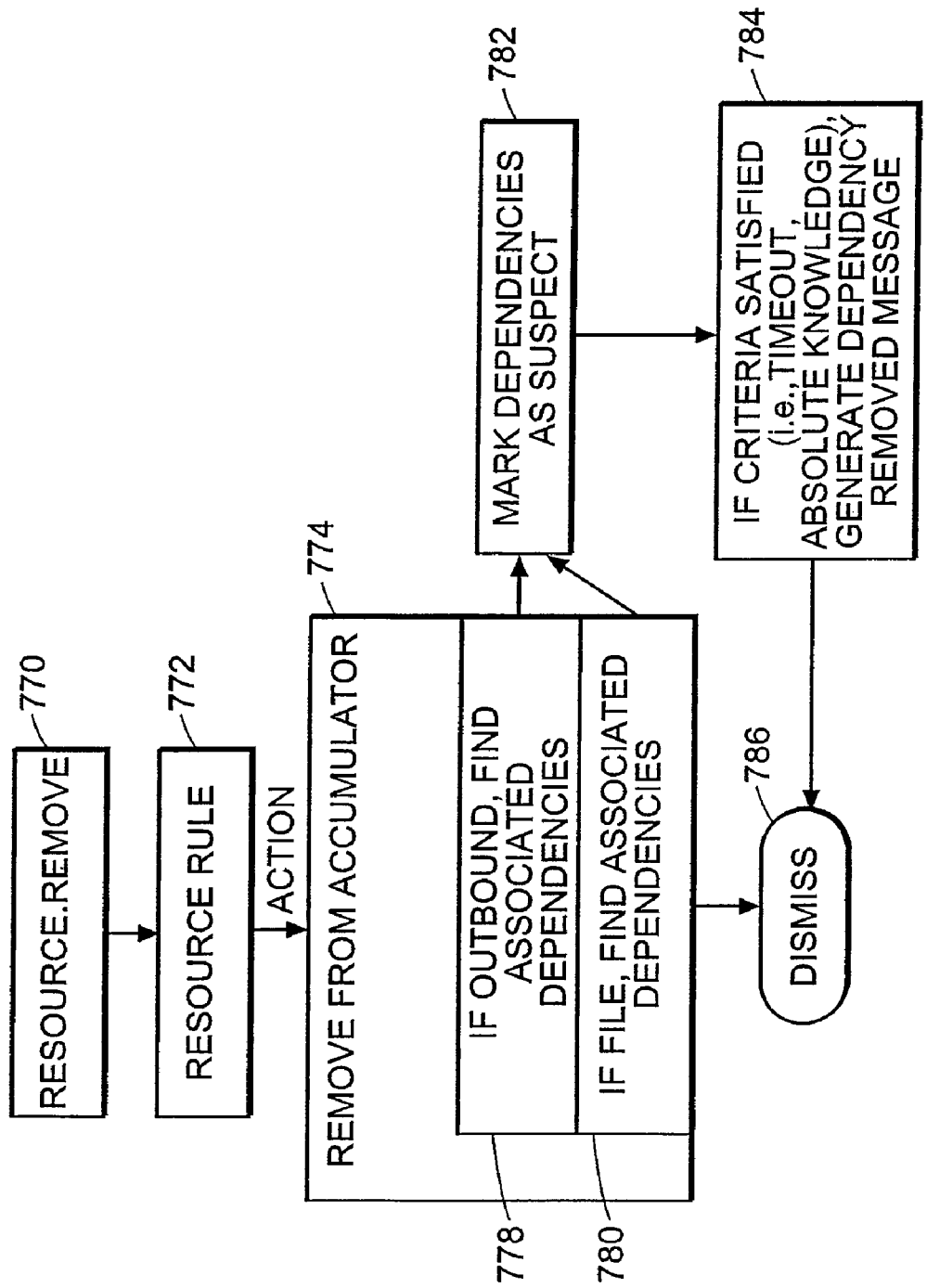
FIG. 7e is a flow chart illustrating the processing of resource removal messages to remove dependencies in one embodiment.

FIGS. 7d and 7e illustrate the processing of resource usage messages in some embodiments. Generally, after the resource usage messages are generated as indicated above with respect to FIGS. 7a-7c, the accumulator 80 (FIG. 2) is used to discover dependencies and the direction of those dependencies.

Referring to FIG. 7d, the processing of a resource usage message (block 750) using a resource rule 752 is shown. FIG. 7d shows the processing of resource usage messages relating to outbound network connections and network listeners, as well as processes or files. Initially, at block 754, the resource usage messages are added to the accumulator 80 (FIG. 2). The accumulator 80 attempts to match outbound connections with listener resources based on information about the resources used (block 756 and 758). In some embodiments, the times of the usages can be used in matching connections with listeners, although in other embodiments, specific time stamps are not used. The accumulator, for instance, can search for resource usage messages indicating that an outbound connection and a listener use the same port of a server (that is, the outbound connection points to a port that is the same port used by the listener on a server). If a match is found, the direction of the dependency is determined at block 762. Generally, the application and server that originated the outbound connection are dependent on the application and server having the port used the listener. In addition, a dependency discovered message is generated at block 764. The resource usage message can then be dismissed (block 766).

The accumulator 80 can also attempt to match resource usages for files and processes on the same server (block 760). If the accumulator finds that two applications use the same resource (such as a file), then a dependency has been found. The direction of the dependency can then be determined (block 762) according to one of three different rules, although other rules could be used in other embodiments. For resources that have no owning application (that is, no application was discovered in which the resource is contained), each of the applications that is using the resource is dependent upon the resource (this is a containment dependency). For resources that have owning applications (that is, the resource is in the directory or model of an application), the application using the resource is dependent on the application that owns the resource unless the application using the resource is executing the application that owns the resource, in which case the relationship is reversed. Similar logic can be followed in determining these dependencies if there are multiple levels of applications running other applications.

FIG. 7e shows the processing of a resource usage removal message (block 770) using a resource rule 772. FIG. 7e shows the processing of resource usage removal messages relating to outbound network connections and network listeners, as well as processes or files. Initially, at block 774, the resource usage removal messages are added to the accumulator 80 (FIG. 2). The accumulator 80 attempts to determine if a dependency exists for the outbound connections that have been removed (block 778). If so, the dependency is marked as being suspect (block 782). The accumulator 80 does nothing with messages regarding removed network listeners because a connection could still exist with the listener being inactive. If the resource usage removal message relates to a file, the accumulator 80 finds the dependencies associated with that file and marks those dependencies as being suspect (blocks 780, 782). Those dependencies marked as being suspect are then dealt with as detailed below.

In some embodiments, messages indicating that dependencies are removed are not generated immediately upon the labeling of a dependency as suspect in block 782. Network connections are not typically maintained constantly, so dependencies spanning between servers are not indicated by constant network connections and listeners. Similarly, files are not constantly used by applications that might be dependent upon each other. For these reasons, messages indicating that dependencies are removed are not always generated immediately upon a dependency being labeled as suspect. Instead, certain criteria can be examined to determine if the dependency should be removed (block 784). If, for instance, a certain length of time (perhaps hours, days, or a week) passes with a dependency being labeled as suspect, a message indicating that the dependency is removed could be generated. Such a message can be generated because the dependency relationship is not active. In another embodiment, other criteria, such as absolute knowledge that the application has been removed, can be used to generate dependency removed messages. The resource usage message can then be dismissed (block 786).

D. Tracking Changes and Filtering Events

After a component has been discovered and all of the pieces of the component are known, it can be desirable to track any changes that are made to the component, determine the differences in the contents of those modified components, and track changes to dependencies that exist in the IT system. If a problem occurs in the functioning of the IT system, the tracked changes can be used to readily identify the application that has stopped working and the changes that may have caused the application to stop working properly. Because a primary hindrance to the successful upgrade and correction of IT system malfunctions is a lack of an accurate record of changes made to the IT system, a visual map of the IT system, including changes made to components of the IT system over time, can be invaluable in remedying system malfunctions.

In order to track these changes, any changes made to one or more of the files, directories, registry settings, or system configuration elements in the fingerprints for the discovered components can be monitored. In some embodiments, only key elements of the fingerprint for an application are monitored. In other embodiments, all of the elements in the fingerprint are monitored. In still other embodiments, more than what is in the fingerprint, such as all of the items in an application, can be monitored. For example, all of the items in a model for the component can be tracked, and all of the items in the installation directory of an application can be tracked. In any event, this list of elements to be tracked can be generated by compiling all of the elements for discovered components that are of interest. For example, the executable files for a discovered application can be tracked so that modifications can easily be discovered. In order to track content changes to components of the IT system, the analysis service of an agent 12 or the network server 10 determines that an event message relates to an application that has already been discovered. The event message will then be logged so that a record of the modification exists. After an event message has been logged, it can be determined what content change was made. For instance, if a file for a discovered application is modified, the current version of the file can be compared to the previous version of the file, and the differences between the content of the two versions can be determined. The modifications to the file can therefore be tracked so that a user can easily see the changes made.

Another aspect of the invention involves the creation of a visual map of the files for each application, along with the structure of the entire IT system. The visual map can list the application, the files of the application, and an icon for the last change made to the file. Upon clicking this icon, the user can be presented with the text of the file and the changes made to the file. The changes can be indicated by placing deleted information in brackets and underlining added material, or by using any other comparing method. This illustration of the actual changes to a file can be useful in troubleshooting for system administrators. In addition to information about changes that have been made to applications of the IT system, the visual map can allow a user to readily view the entire hardware platform of the IT system, as well as the applications and infrastructure applications, such as web servers, databases, and other infrastructure applications installed on a particular server. The visual map can also allow a user to select an application and view the list of files and registry entries associated with the application. The visual map can also be used to illustrate the dependencies between the various components of the IT system. The visual map can be automatically updated as the IT system changes.

Figure 8:
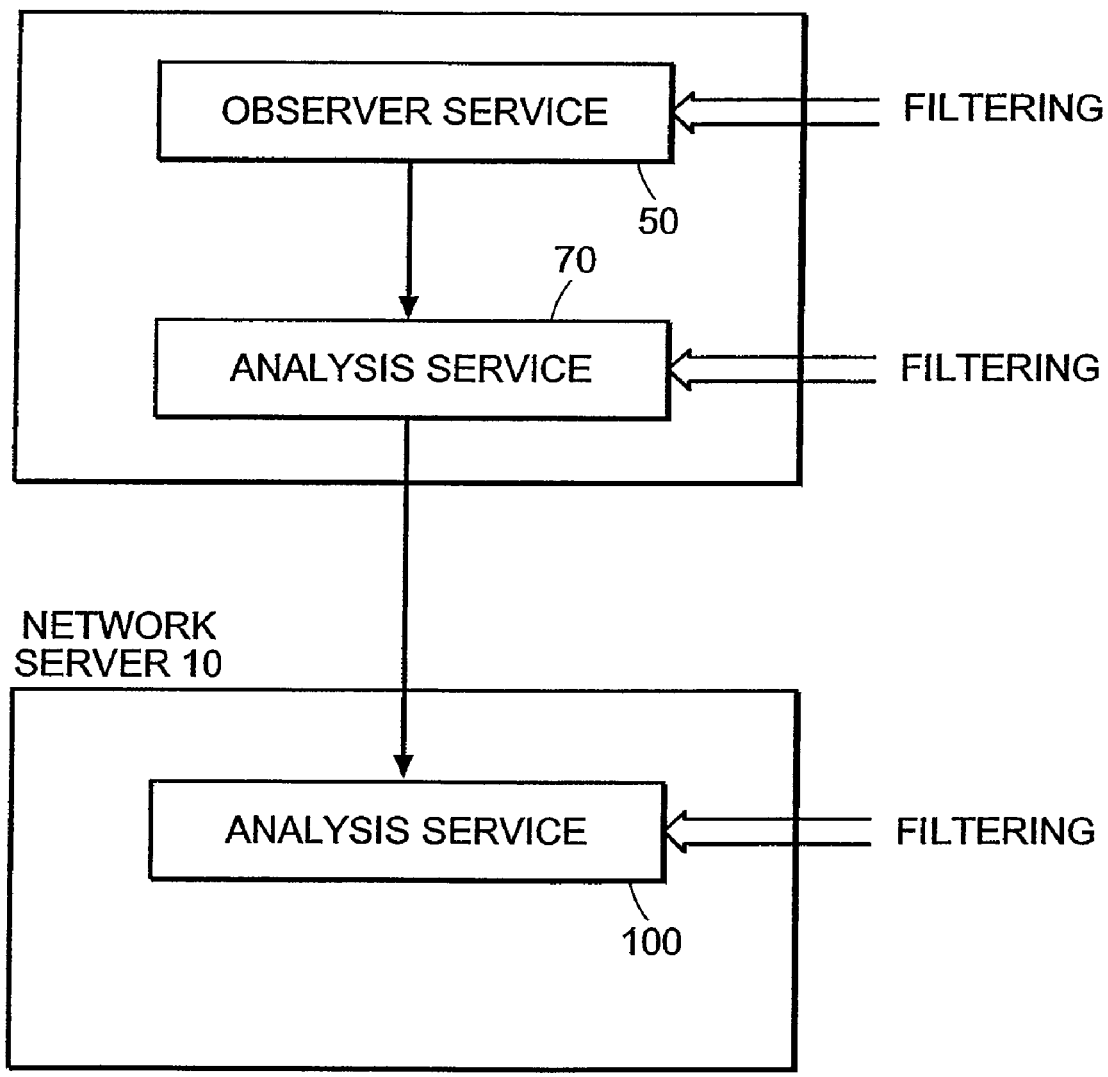
FIG. 8 is a block diagram that illustrates the filtering of information at different locations in the network of FIG. 1.

FIG. 8 shows the use of filtering to reduce the amount of event information transmitted and processed in the system. Because a large number of events, such as file creations or deletions, can take place within a server in the IT system, filters can be used to reduce the amount of information transmitted using the system. Generally, each filter used in the IT system should let through the event information that matters for discovery and tracking, and filter out the remaining event information. The event information that matters, generally, is event information that corresponds to elements of a fingerprint or that corresponds to a detected or discovered component. In order to determine which event information to pass through a filter, therefore, the fingerprints used in the system can be analyzed.

Filters can be either exclusionary filters or inclusionary filters. Inclusionary filters let certain event messages that match a list of elements in the filter pass through the filter and exclude or filter out all other event messages. The list of elements that matter for the filter, and that will thus be passed through, are those elements that correspond to elements in fingerprints. These will be the elements that will be matched during discovery and tracked after they are discovered. A list of all files in fingerprints of the system, along with all other elements of the fingerprints, can therefore be created for use in the filters of the system. Exclusionary filters, on the other hand, let through all event messages except certain messages that fit certain criteria. For example, an exclusionary filter could filter out all event information regarding the creation of any files with ".log" extensions or any files that are larger than a certain size, and all other event information could pass through the exclusionary filter.

In the embodiment of FIG. 8, event information can first be filtered in an observer 52, 54, 56, 60, 62 of the agent 12. After this event information has been transmitted to the analysis service 70 of the agent 12 and analyzed there, some of the event information can again be filtered out. If an application is purely local to an agent, for instance, all event information that matches a fingerprint for that application need not be passed through to the network server 10. Instead, the fingerprint for that application can be matched locally at the agent 12 and then, after the application has been discovered, an application discovered message and other information about the application can be passed through to the network server 10. In this manner, only a limited amount of event information will be passed through to the network server 10 from the agents of the system. A final filtering process can take place within the analysis service 100 of the network server 10. This filtering process can filter out unneeded event messages so that every event that takes place within the IT system and is sent to the network server 10 is not saved within the network server 10.

E. Operation of Component Discovery

Figure 9:
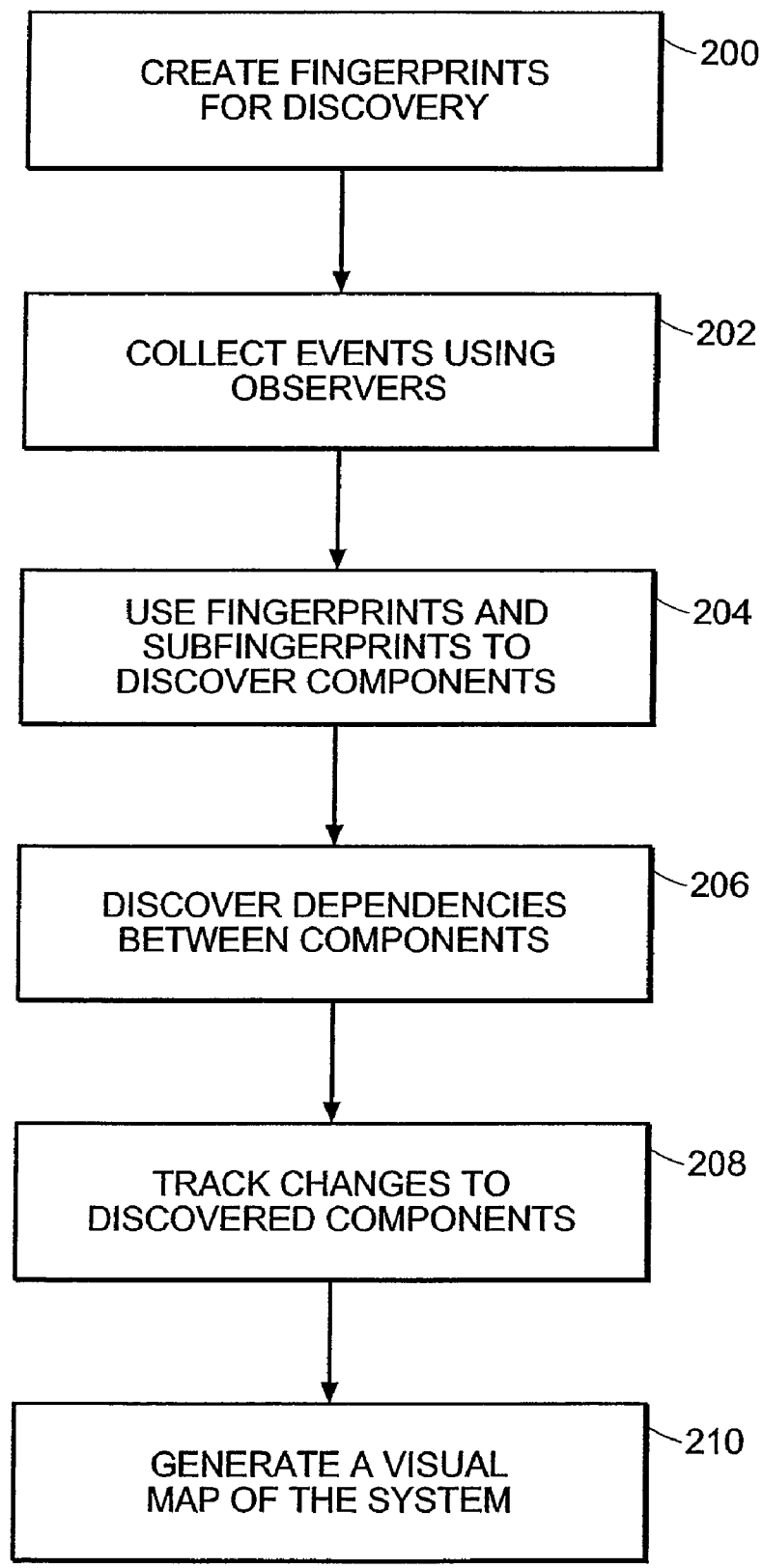
FIG. 9 is a flow chart illustrating the flow of event information during operation of the network of FIG. 1 in one embodiment of the invention.

FIG. 9 is a flow chart illustrating the operation of the network in one embodiment. At block 200, fingerprints and subfingerprints are created. The modeling service 120 depicted in FIG. 3 can be used for the creation of these fingerprints and subfingerprints. Event information is then collected by an observer, as depicted at block 202 of FIG. 9. The observer service 50 of the agents 12 of the system can be used to detect these events (FIG. 2) as discussed above.

At block 204 of FIG. 9, the fingerprints and subfingerprints are used to discover components in the IT system. Referring to FIG. 2, the analysis service 70 of the agent 12, including the rule engine 74, accumulator 80, and fingerprint database 84 can be used for the discovery of components at the agent-level. The analysis at the agent level generally focuses on the local system of the agent or the remote server that the agent monitors. As described above, event information of a fingerprint from the fingerprint database 84 can be matched in the accumulator 80 until all of the passive elements of the fingerprint have been matched. At that point, an application discovered message can be generated by the fingerprint and the rule engine 74. In some embodiments, the active elements of the fingerprint can then trigger command messages to search for certain types of elements, and subfingerprints can then be matched to discover subcomponents that relate in some way to the component of the original fingerprint (that is, versions of the component or optional pieces that can be used with the component). The subfingerprints can then be matched in the same manner as the fingerprints.

The processing within the network server is similar to that within the agent. Referring to FIG. 3, the analysis service 100 of the network server 10, including the rule engine 104, accumulator 110, and database 130 can be used for the discovery of components at the network-level, including components that span more than one server of the system.

It should be noted that an event message can be processed by more than one processing service. Some types of event messages, for instance, can be directed to component or subcomponent discovery through fingerprints. Other types of event messages, on the other hand, can be directed to a dependency analysis service to discover dependencies between components. Block 206 of FIG. 9 depicts the act of discovering the dependencies between components. Block 208 then depicts the tracking of changes to discovered components in the IT system, as discussed in more detail above.

Figure 10:
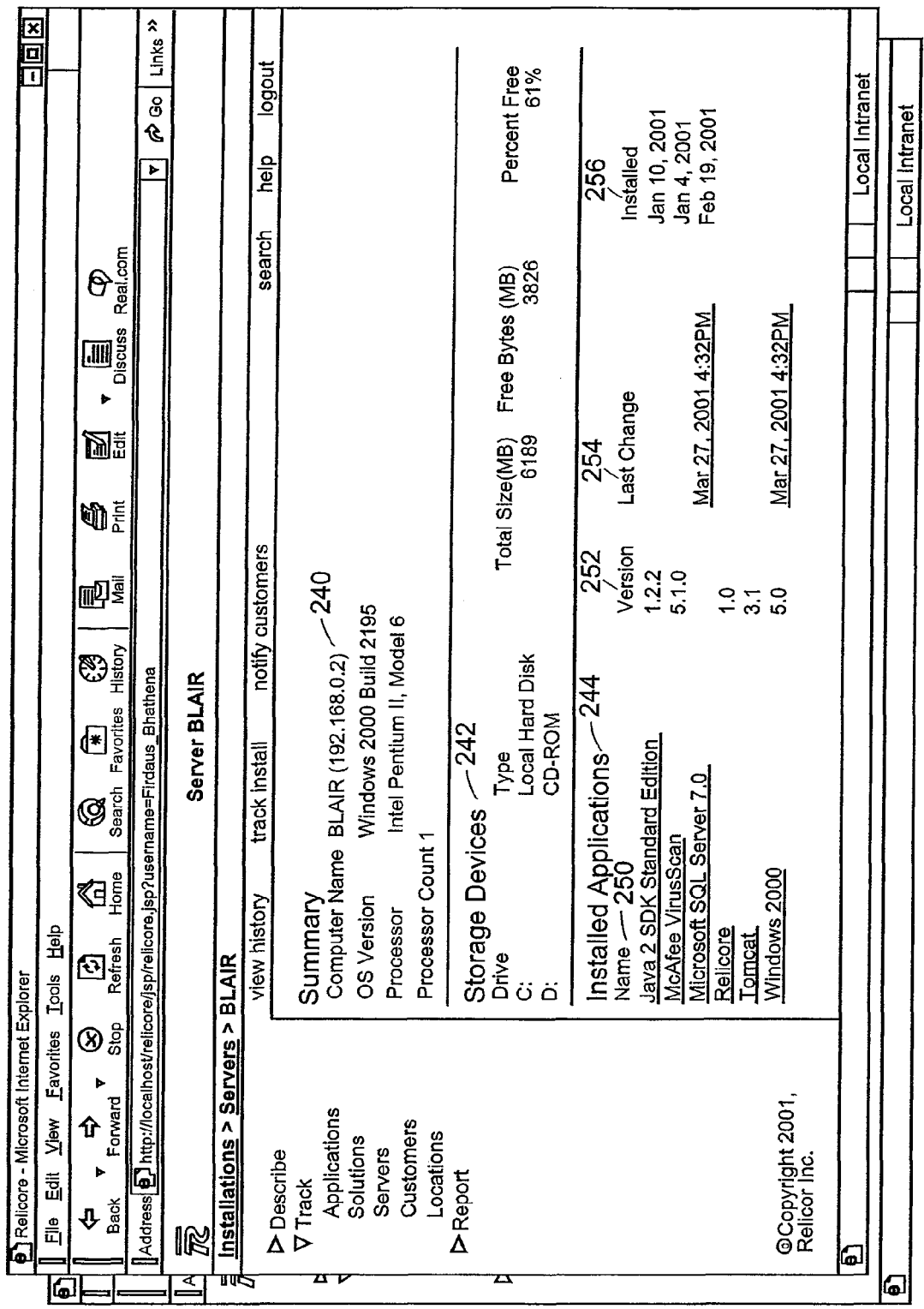
FIG. 10 is a depiction of one embodiment of a visual map of one computer of a system that can be used in conjunction with the invention.

A visual map can be generated to show the components of the system, as well as the dependencies between components and the changes made to components of the system. Block 210 of FIG. 9 depicts this act of generating a visual map. This visual map can also show locations and associations between components of the system. For example, servers existing in one location or owned by particular entities can be indicated so that relations between hardware and software components of the system can be readily seen. FIG. 10 shows one possible embodiment of a visual map of the components of one computer of a system. In FIG. 10, a summary section of the visual map contains information regarding the computer itself, such as the computer name 240. Another section of this visual map shows information regarding the storage devices 242 of the computer. A third and final section shows information regarding the installed applications 244, or discovered applications, of the computer. A first column in this section gives the name 250 of the application, a second column gives the version 252 of the application that was discovered, a third column gives the date of the last change 254 to the application, and a fourth column gives the installation date 256 of the application. In one embodiment, a user can click on a date in the last change column 254 to be given details of the recent changes to the application.

F. Examples of Operation

FIGS. 11-14 depict flow charts of the operation of the method and system in an agent in response to four different types of messages that can be created in the network: exist messages; delete messages; modified messages; and application discovered messages. FIGS. 11-14 depict only four varieties of event messages. In addition to these type of messages, other event messages, such as those discussed above in relation to the observers, can be processed. Event messages regarding outbound network requests, for instance, can be analyzed for dependency relationships.

1. Exist Messages

Figure 11:
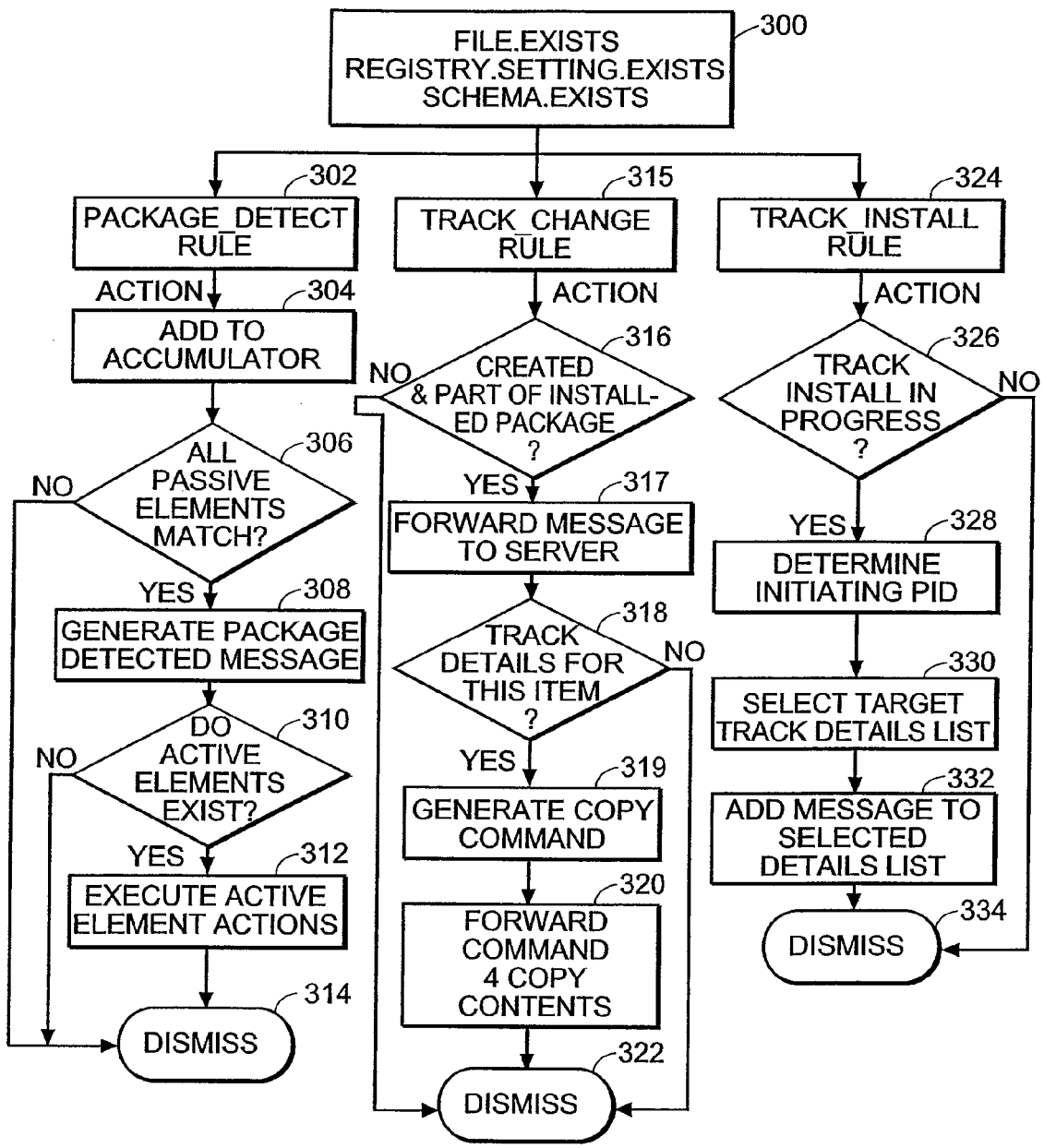
FIG. 11 is flow chart of the rules and processes in the operation of one embodiment in response to an exist message in the network of FIG. 1.

FIG. 11 shows the functions in one embodiment after a message indicating that a file, registry, or database schema exists or has been created is generated by an observer. FIG. 11 lists exist messages relating to files, registries, and schemas (see block 300). For simplicity, however, the following discussion relating to exist messages refers specifically to files, although it should be noted that the same procedures can be followed for registries and schemas. In addition, the functions depicted in FIG. 11 can be carried out in the either in the agent or in the network server 10 of the system.

Initially, as indicated by block 300 of FIG. 11, a message indicating that a file has been created is received. Such a message can be generated, in one embodiment, by the file observer 62 of the agent 12 (FIG. 2) whenever a new file is detected. The detection of a new file can occur through reactive notification by a driver that detects the file being created in real-time or through proactive notification by crawling of the file system of the server on which an agent resides.

In the embodiment of FIG. 11, each file create message is a candidate for three possible system rules: a component (or package) detect rule 302, a track changes rule 315, and a track install rule 324. Each file create message can be subject to one or more of these rules, and generally a filter can be used for the logic set for each rule to determine if the functions associated with the rule will be performed. For example, a filter can determine if a created file is of the type of file that might matter for component detection and, if so, the message for the created file will be passed on to the logic of the component detect rule 302. If the event message fails the filter, the event message is discarded.

The component detect rule 302 is generally responsible for adding the information received in the file create message to an accumulator that can be used for discovery, as indicated by block 304 of FIG. 11. In an embodiment in which the component is an application, for instance, a number of files and registry keys could make up the passive elements of a fingerprint for a known component. Referring to FIG. 2, the component detection rules 76 along with the accumulator 80 and fingerprint database 84 will be used to determine if the passive portions of any fingerprints have now been fully matched (block 306 of FIG. 11 depicts this determination). If all of the passive elements of a fingerprint have been matched, a component detected message will be generated, as indicated by block 308. Such a message will then be used in the application discovered embodiment illustrated in FIG. 14.

Referring again to FIG. 11, if all of the passive elements of a fingerprint do match, a determination will be made as to whether any active elements exist for the fingerprint, as indicated by block 310. If a fingerprint does contain active elements, the active elements subfingerprints will be activated and these subfingerprints will be added to the set of fingerprints being considered by the accumulator. As discussed above in connection with model-based discovery, subfingerprints can be used to discover, in some embodiments, versions of an application or optional pieces that can be used with a component. Each of these active element subfingerprints can have one or more active elements associated with them that can be executed, as indicated by block 312. These actions can, for instance, allow the agents to gather additional information that can be used in the discovery process to match the subfingerprints for subcomponents that might exist in the IT system. These actions can include, for instance, commands to gather more detailed information about files, such as the size of certain files, or about registry keys or directory structures. Referring again to FIG. 2, the commands 92 to gather more detailed information can be sent to the observer service 50 of the agent 12 for use in discovery. Further event messages 94 (FIG. 2) received during this active discovery process can then be used to determine if a subfingerprint has been matched, thus indicating the presence of a subcomponent on the IT system. After these processes of the component detect rule 302 (FIG. 11) have been completed, the file create message can be logged and the event message can be dismissed as having been processed, as indicated by block 314.

The track changes rule 315 is the second possible rule set that can be carried out for a file create message. Generally, a file exists message will be subject to the track changes rule 315 if the created file passes through a filter set that the file is of the type for which changes are being tracked. Generally, file changes are tracked for files that are part of applications that have been discovered in the system already (that is, installed components). A determination is therefore made as to whether the file has been created and is part of an installed component or application for which tracking changes would be appropriate. Block 316 of FIG. 11 depicts this determination. If the file is not part of an installed component, the message is dismissed, as indicated by block 322.

If the file is part of an installed component, the event message is forwarded to the network server (block 317). The event message can include information such as the user name of the person who created the file and when it was created. If the file is one of the items for which changes are being tracked (block 318), the agent generates a command to copy the contents of the file at block 319. This command is forwarded to the appropriate observer (block 320) so that the contents of the file can be copied. A copy of the file contents is then made so that these contents can later be used in tracking changes to the file contents if the file is modified.

The track install rule 324 is the third possible rule set than can be performed for a file create message 300. Initially, this rule determines if a track install is in progress, as indicated by block 326 of FIG. 11. In one embodiment, a track install can be indicated by a user of the system who is installing an application. If such a track install is in progress, a determination can be made as to which installation and application the created message should be attributed. Block 328 depicts the determination of the initiating process identifier ("PID"). Block 330 depicts the selection of target track details lists. Block 332 indicates the addition of the file create message to the list of selected details of the application being installed. After the processing of the track install rules, or if a track install is not in progress, the file create message can be dismissed, as indicated by block 334.

2. Delete Messages

Figure 12:
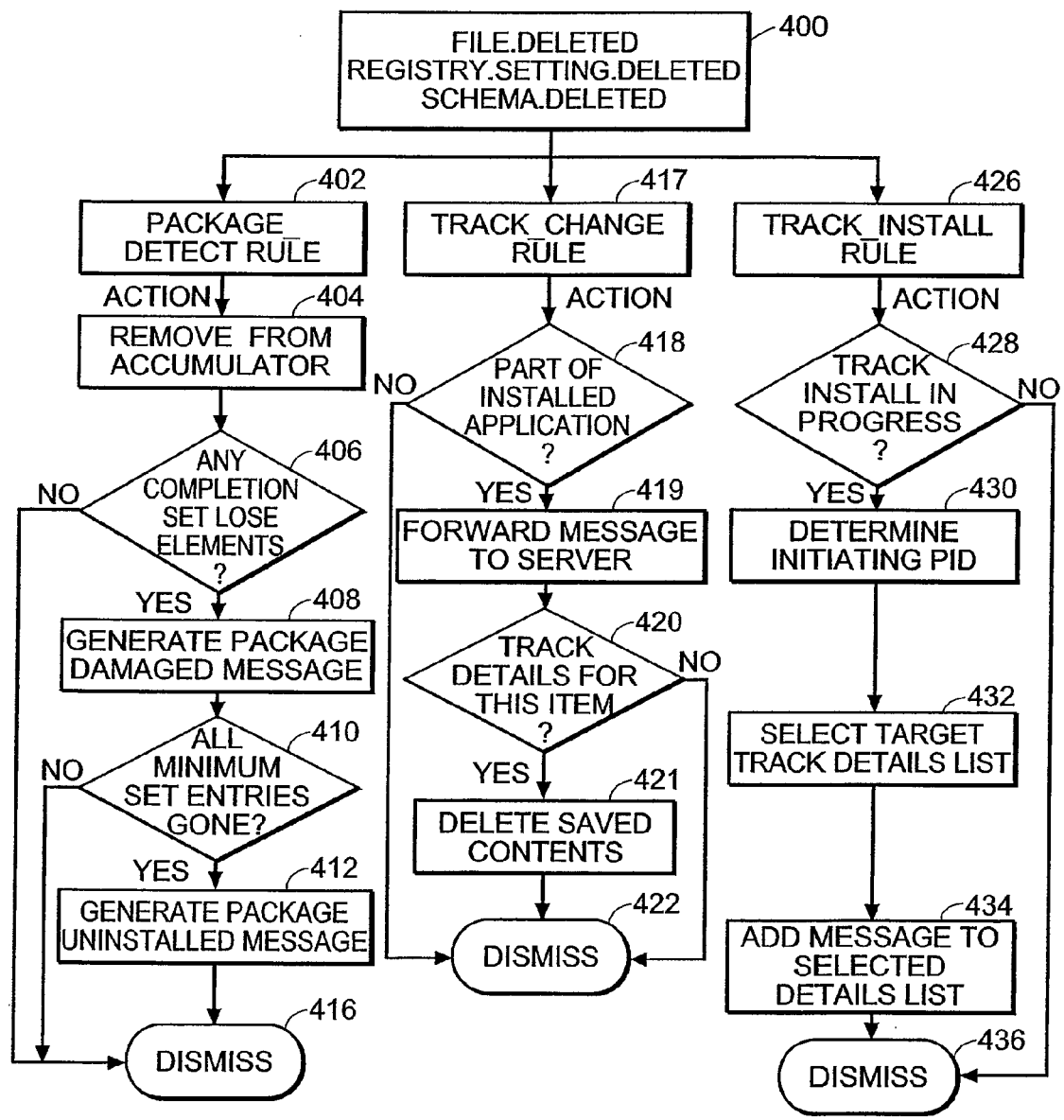
FIG. 12 is flow chart of the rules and processes in the operation of one embodiment in response to a delete message in the network of FIG. 1.

FIG. 12 shows the functions in one embodiment after a message indicating that a file, registry setting, or schema has been deleted is generated by the system. It should be noted that the functions depicted in FIG. 12 can be carried out in either an agent or in the network server 12 of the system. The discussion below for FIG. 12 will focus on registry settings, but it should be noted that the same procedures can be followed for deleted files and schemas as well.

Initially, as indicated by block 400 of FIG. 12, a message indicating that a registry setting has been deleted is received. A registry deleted message can be generated by the registry observer of the agent 12 (FIG. 2) whenever a registry deletion is detected, and reactive notification or proactive notification can be used.

In the embodiment of FIG. 12, each registry setting deleted message is a candidate for three possible system rules: a component detect rule 402, a track changes rule 417, and a track install rule 426. Fewer or more rules could be used in other embodiments. The component detect rule 402 is generally responsible for removing the information received in the registry setting deleted message from an accumulator that can be used for discovery, as indicated by block 404 of FIG. 12. A determination is made as to whether any fingerprints have lost elements. FIG. 12 depicts the determination of whether any elements from a complete set of a fingerprint have been lost, as indicated by block 406. If one or more fingerprints have lost an element from the complete set, a component damaged message can be generated, as indicated by block 408. Such a component damaged message can indicate to users of the IT system that something has changed for components that had previously been discovered.

If a component had previously been discovered and later loses an element, a "weak" match for the corresponding fingerprint can exist. Such a weak match indicates that, at some point, all of the elements of the fingerprint were matched, but one or more files changed so that the fingerprint is no longer entirely matched. This weak match can indicate, in some embodiments, that the component still exists, but may need to be reconstructed to be useful. In other words, if the component is an application, the application has been damaged, but it is believed that the application still exists.

If the minimum set a fingerprint becomes empty such that no elements in the minimum set of the fingerprint remain matched (block 410), a component uninstalled message can be generated, as indicated by block 412. If none of the elements of the minimum set of the fingerprint are matched any longer, it can be assumed that the component has been uninstalled, deleted, or is thoroughly damaged. If the minimum set of a fingerprint becomes empty, any active element subfingerprints can be deactivated so that discovery of the corresponding subcomponents will no longer be attempted (block 414 of FIG. 12). The deactivation of the active element subfingerprints also decreases the amount of information sought to be discovered by the agents of the IT system. The active element subfingerprints can be deactivated and removed from the set of fingerprints being considered by the accumulator. After the deactivation of active elements for any fingerprint that is empty, the registry setting deleted message can be dismissed (block 416) as having been fully processed. In other embodiments, all of the subfingerprints remain active at all times.

The track changes rule 417 is the second possible rule set that can be carried out for a registry setting deleted message. Block 418 of FIG. 12 depicts an act of determining if the registry setting is part of an installed component. If not, the message is discarded, as indicated at block 422. If the registry setting is part of an installed application, the message is forwarded to the network server so that the deletion can be noted. If the registry setting is a registry setting for which content changes are being tracked, as determined at block 420, the contents of the registry setting that were saved when the registry setting was created or modified are deleted so that unneeded information is not retained on the system (block 421).

The track install rule 426 is the third possible rule set than can be performed for a registry setting deleted message. Initially, this rule determines if a track install is in progress, as indicated by block 428 of FIG. 12. In one embodiment, a track install can be indicated by a user of the system who is installing an application. If such a track install is in progress, a determination can be made as to which installation and application the message should be attributed. Block 430 depicts the determination of the initiating process identifier. Block 432 depicts the selection of target track details list. Block 434 indicates the addition of the file delete message to the list of selected details of the application being installed. After the processing of the track install rules, the registry setting deleted message can be dismissed, as indicated by block 436.

3. Modify Messages

Figure 13:
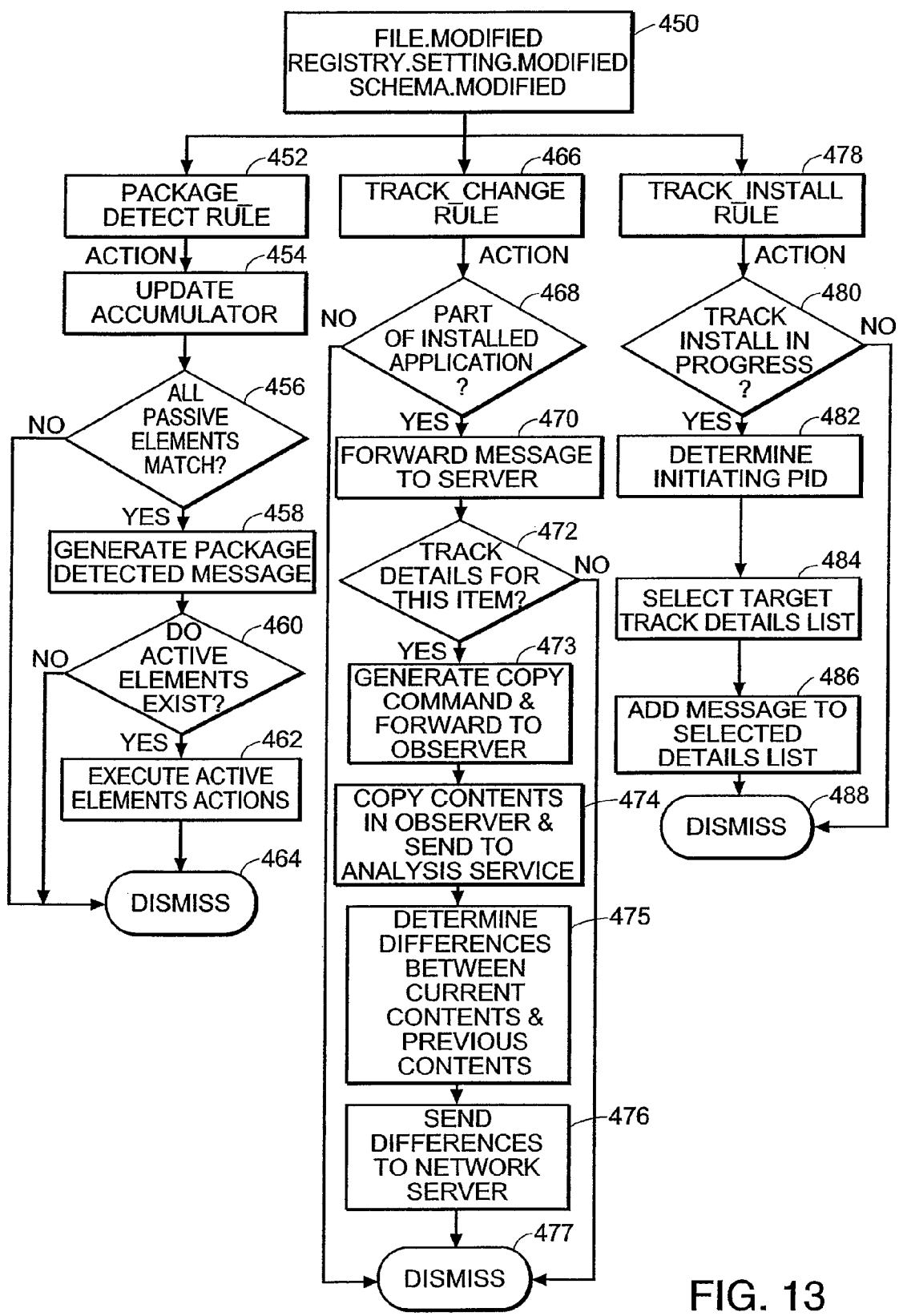
FIG. 13 is a flow chart of the rules and process in the operation of one embodiment in response to a modify message in the network of FIG. 1.

FIG. 13 shows the functions in one embodiment after a message indicating that a file, registry, or schema has been modified is generated by an observer. FIG. 13 lists modify messages relating to files, registries, and schemas (see block 450). For simplicity, however, the following discussion relating to modify messages refers specifically to files, although it should be noted that the same procedures can be followed for registries and schemas. In addition, the functions depicted in FIG. 13 can be carried out in the either in the agent or in the network server 10 of the system.

Initially, as indicated by block 450 of FIG. 13, a message indicating that a file has been modified is received. The detection of a modified file can occur through reactive notification by a driver that detects the file being modified in real-time or through proactive notification by crawling of the file system of the server on which an agent resides.

In the embodiment of FIG. 13, each file modified message is a candidate for three possible system rules: a component (or package) detect rule 452, a track changes rule 466, and a track install rule 478. Each file modified message can be subject to one or more of these rules, and generally a filter can be used for the logic set for each rule to determine if the functions associated with the rule will be performed.

The component detect rule 452 works generally the same as the component detect rule 302 for an exist message in FIG. 11, and the component detect rule 452 is generally responsible for adding the information received in the file modify message to an accumulator that can be used for discovery, as indicated by block 454 of FIG. 13. In an embodiment in which the component is an application, for instance, a number of files and registry keys could make up the passive elements of a fingerprint for a known component. Referring to FIG. 2, the component detection rules 76 along with the accumulator 80 and fingerprint database 84 will be used to determine if the passive portions of any fingerprints have now been fully matched (block 456 of FIG. 13 depicts this determination). If all of the passive elements of a fingerprint have been matched, a component discovered message will be generated, as indicated by block 458. Such a message will then be used in the application discovered embodiment illustrated in FIG. 14.

Referring again to FIG. 13, if all of the passive elements of a fingerprint do match, a determination will be made as to whether any active elements exist for the fingerprint, as indicated by block 460. If a fingerprint does contain active elements, the active elements subfingerprints will be activated and these subfingerprints will be added to the set of fingerprints being considered by the accumulator. Generally, the active elements of the fingerprint can then be executed, as block 462 indicates. Such features work substantially the same as discussed in connection with blocks 310 and 312 of FIG. 11. After these processes of the component detect rule 452 (FIG. 13) have been completed, the file modified message can be logged and the event message can be dismissed as having been processed, as indicated by block 464.

The track changes rule 466 is the second possible rule set that can be carried out for a file modified message. Generally, file modifications are tracked for files that are part of applications that have been discovered in the system already (that is, installed components). A determination is therefore made as to whether the file is part of an installed component or application for which tracking changes would be appropriate. Block 468 of FIG. 13 depicts this determination. If the file is not part of an installed component, the message is dismissed, as indicated by block 477.

If the file is part of an installed component, the event message is forwarded to the network server for analysis (block 470). If the file is one of the items for which content changes are being tracked (block 472), a copy command is generated (block 473) and forwarded to the observer. The observer then copies the contents of the file and forwards these contents to the analysis engine of the agent (block 474). The analysis engine of the agent will then have the current contents of the file and the previous contents of the file (that is, the contents before the modification). The analysis engine can therefore compare the current contents to the previous contents and determine the differences in content (block 475). A message containing the differences in content can then be forwarded to the network server (block 476). In addition, the analysis engine can save the current contents of the file so that they can be used to determine differences if the file is modified again. The event message can then be discarded, as indicated by block 477.

The track install rule 478 is the third possible rule set that can be performed for a file modified message 450. Initially, this rule determines if a track install is in progress, as indicated by block 480 of FIG. 13. In one embodiment, a track install can be indicated by a user of the system who is installing an application. If such a track install is in progress, a determination can be made as to which installation and application the created message should be attributed. Block 482 depicts the determination of the process identifier ("PID"). Block 484 depicts the selection of target track details lists. Block 486 indicates the addition of the file modified message to the list of selected details of the application being installed. After the processing of the track install rules, or if a track install is not in progress, the file modified message can be dismissed, as indicated by block 334.

4. Application Discovered Messages

Figure 14:
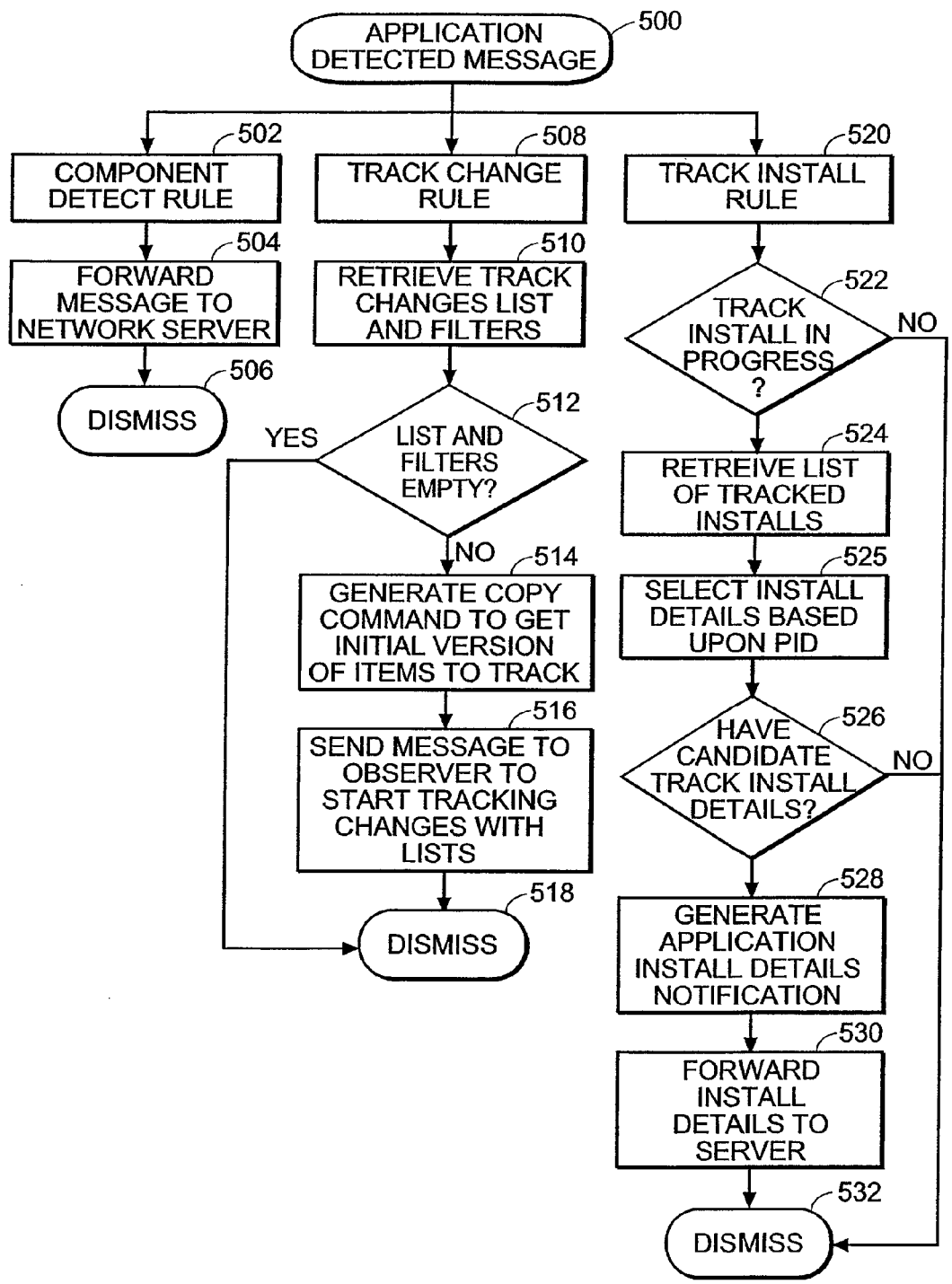
FIG. 14 is flow chart of the rules and processes in the operation of one embodiment in response to an application discovered message in the network of FIG. 1.

FIG. 14 shows the functions in one embodiment after a message indicating that an application has been discovered has been generated by the system. As noted earlier, an accumulator within an agent or network server generates an application discovered message when a fingerprint has been matched (or when the complete or detect set of a fingerprint has been matched). Initially, as indicated by block 500 of FIG. 14, a message indicating that an application has been discovered is received.

In the embodiment of FIG. 14, each application discovered message is a candidate for three possible system rules: a component detect rule 502, a track changes rule 508, and a track install rule 520. Fewer or more rules can be used in other embodiments. In some embodiments, filters are not used for application discovered messages or other messages generated by the agents or network server. Generally, these filters are not used in this embodiment because every discovered application can be considered important for some aspects of the IT system.

The component detect rule 502 is generally responsible for the limited task of forwarding a message to the network server 10 indicating that an application has been installed, as indicated by block 504 of FIG. 14. Block 506 then depicts the dismissal of the application discovered message. Generally, the file create rules of FIG. 11 and the file delete rules of FIG. 12 can be processed within the agents of the system, and, as indicated in block 504 of FIG. 14, application discovered messages can be delivered to the network server 10 for further processing.

The track changes rule 508 is the second possible rule set that can be carried out for an application discovered message. Generally, this rule is responsible for determining if the application that has just been discovered has content change tracking enabled and, if so, it determines any processing that needs to be done to set up such tracking. Initially, therefore, a track changes list and filters for the application can be retrieved, as indicated by block 510 of FIG. 14. If this list of files, registry keys, and other elements to be tracked and the list of filters is empty, the application discovered message can be dismissed by this rule, as indicated by block 518. If the determination of whether there are files and filters for which changes will be tracked (block 512) shows that such files and filters exist, a copy message will be generated to get the initial version of items to track for the application, as indicated by block 514. Block 516 then shows the delivery of a message to an observer (FIG. 2) of the agents so that the tracking of changes can take place within the agents of the system.

The track install rule 520 is the third possible rule set than can be performed for an application discovered message. This rule is responsible for matching up the set of tracked installation details with any applications that are discovered. This procedure can be complicated because a number of track installs can be present at any given time. If such a track install is in progress (determined at block 522 of FIG. 14), a determination can be made as to which installation and application the created message should be attributed. If a track install is in progress, block 524 depicts the retrieval of a list of tracked installs that are in progress. An attempt is then made to match the new application with the correct set of installation details, which can be indicated by a PID (block 525). If the details of the track install are available, as determined at block 526, an application install details message can be generated (block 528). The installation details can then be forwarded to the network server 10. After the processing of the track install rules, the application discovered message can be dismissed, as indicated by block 532.

The agents can also perform actions in response to other event messages received in the system. For instance, event messages can be generated that indicate that a copy procedure, such as the copy of a file, registry key, or schema, has been completed. In response to such a message, the track changes rule can determine if the previous version of the file, registry key, or schema is available. If the previous version is available, the new copy of the file, registry key, or schema is compared to the old copy, and the differences are determined. A message containing the differences between the copies can then be generated and forwarded to the server. Difference messages can then be readily used for tracking changes in the IT system.

The accompanying Figures depict embodiments of the methods and devices of the present invention, and features and components thereof. While the present invention has been described with reference to several embodiments thereof, those skilled in the art will recognize various changes that may be made without departing from the spirit and scope of the claimed invention. Accordingly, the invention is not limited to what is shown in the drawings and described in the specification, but only as indicated in the appended claims.

What is claimed is:

1. A non-transitory computer-readable medium storing program instructions executable to:
   store a fingerprint specifying a plurality of attributes of a component of an information technology (IT) system;
   automatically discover the existence of the component in the IT system using the fingerprint, wherein automatically discovering the existence of the component comprises:
      receiving a plurality of event messages indicating a plurality of real-time events that occur in the IT system, wherein each event message matches a respective attribute specified by the fingerprint; and
      determining that event messages matching each attribute of the plurality of attributes specified by the fingerprint have been received;
   wherein the plurality of event messages includes a first event message indicating a first real-time event selected from the following real-time events: a file creation, a file deletion, a file modification, a registry key creation, a registry key deletion, or a registry key modification.

2. The non-transitory computer-readable medium of claim 1, wherein the component is a software application.

3. The non-transitory computer-readable medium of claim 1, wherein the first real-time event is a file creation, a file deletion, or a file modification.

4. The non-transitory computer-readable medium of claim 1, wherein the first real-time event is a registry key creation, a registry key deletion, or a registry key modification.

5. The non-transitory computer-readable medium of claim 1, wherein the plurality of event messages includes a first event message indicating detection of a particular element of the component in the IT system.

6. The non-transitory computer-readable medium of claim 1, wherein the program instructions are further executable to:
after discovering the existence of the component, receive a subsequent event message indicating that an element of the component was deleted; and
indicate that the component has been damaged in response to the subsequent event message.

7. The non-transitory computer-readable medium of claim 1, wherein the program instructions are further executable to:
after discovering the existence of the component, receive one or more subsequent event messages indicating that one or more elements of the component were deleted; and
indicate that the component has been uninstalled from the IT system in response to the one or more subsequent event messages.

8. The non-transitory computer-readable medium of claim 1, wherein the program instructions are further executable to track changes to the component after discovering the component.

9. The non-transitory computer-readable medium of claim 1, wherein the program instructions are further executable to:
store a subfingerprint specifying one or more attributes of a refinement of the component;
in response to discovering the component, perform one or more commands to obtain information regarding the component; and
automatically discover the refinement of the component in the IT system by matching the information regarding the component to the one or more attributes of the refinement of the component specified by the subfingerprint.

10. The non-transitory computer-readable medium of claim 9, wherein the refinement of the component is a particular version of the component, wherein discovering the refinement of the component comprises discovering that the particular version of the component exists in the IT system.

11. The non-transitory computer-readable medium of claim 9, wherein the refinement of the component is an optional piece of the component, wherein discovering the refinement of the component comprises discovering that the optional piece of the component exists in the IT system.

12. A system comprising:
one or more processors; and
memory storing program instructions;
wherein the program instructions are executable by the one or more processors to:
store a fingerprint specifying a plurality of attributes of a component of an information technology (IT) system;
automatically discover the existence of the component in the IT system using the fingerprint, wherein automatically discovering the existence of the component comprises:
receiving a plurality of event messages indicating a plurality of real-time events that occur in the IT system, wherein each event message matches a respective attribute specified by the fingerprint; and
determining that event messages matching each attribute of the plurality of attributes specified by the fingerprint have been received;
wherein the plurality of event messages includes a first event message indicating a first real-time event selected from the following real-time events: a file creation, a file deletion, a file modification, a registry key creation, a registry key deletion, or a registry key modification.

13. The system of claim 12, wherein the component is a software application.

14. The system of claim 12, wherein the first real-time event is a file creation, a file deletion, or a file modification.

15. The system of claim 12, wherein the first real-time event is a registry key creation, a registry key deletion, or a registry key modification.

16. The system of claim 12, wherein the program instructions are further executable by the one or more processors to track changes to the component after discovering the component.

17. The system of claim 12, wherein the program instructions are further executable by the one or more processors to:
store a subfingerprint specifying one or more attributes of a refinement of the component;
in response to discovering the component, perform one or more commands to obtain information regarding the component; and
automatically discover the refinement of the component in the IT system by matching the information regarding the component to the one or more attributes of the refinement of the component specified by the subfingerprint.

18. The system of claim 17, wherein the refinement of the component is a particular version of the component, wherein discovering the refinement of the component comprises discovering that the particular version of the component exists in the IT system.

19. The system of claim 17, wherein the refinement of the component is an optional piece of the component, wherein discovering the refinement of the component comprises discovering that the optional piece of the component exists in the IT system.

20. A method, comprising:
a computer system storing a fingerprint specifying a plurality of attributes of a component of an information technology (IT) system;
automatically discovering the existence of the component in the IT system using the fingerprint, wherein automatically discovering the existence of the component comprises:
receiving a plurality of event messages indicating a plurality of real-time events that occur in the IT system, wherein each event message matches a respective attribute specified by the fingerprint; and
determining that event messages matching each attribute of the plurality of attributes specified by the fingerprint have been received;
wherein the plurality of event messages includes a first event message indicating a first real-time event selected from the following real-time events: a file creation, a file deletion, a file modification, a registry_key creation, a registry_key deletion, or a registry_key modification.

* * * * *